US012119157B2

(12) United States Patent
Mizumura et al.

(10) Patent No.: US 12,119,157 B2

(45) Date of Patent: Oct. 15, 2024

(54) WOUND CORE

(71) Applicant: NIPPON STEEL CORPORATION, Tokyo (JP)

(72) Inventors: Takahito Mizumura, Tokyo (JP); Hisashi Mogi, Tokyo (JP); Masaru Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/684,573

(22) PCT Filed: Oct. 4, 2022

(86) PCT No.: PCT/JP2022/037138

§ 371 (c)(1),
(2) Date: Feb. 16, 2024

(87) PCT Pub. No.: WO2023/058655

PCT Pub. Date: Apr. 13, 2023

(65) Prior Publication Data

US 2024/0266102 A1 Aug. 8, 2024

(30) Foreign Application Priority Data

Oct. 4, 2021 (JP) ................................ 2021-163557

(51) Int. Cl.
*H01F 27/245* (2006.01)
*H01F 3/02* (2006.01)
(Continued)

(52) U.S. Cl.
CPC ........... *H01F 27/2455* (2013.01); *H01F 3/02* (2013.01); *H01F 1/14775* (2013.01); *H01F 41/0233* (2013.01)

(58) Field of Classification Search
CPC .... H01F 27/2455; H01F 3/02; H01F 1/14775; H01F 41/0233
(Continued)

(56) References Cited

U.S. PATENT DOCUMENTS 3,307,132 A * 2/1967 Ellis .................... H01F 41/0206 336/213
6,473,961 B1 * 11/2002 Segal ...................... H01F 27/25 29/609
(Continued)

FOREIGN PATENT DOCUMENTS

JP 55-109533 A 8/1980
JP 3081863 U 11/2001
(Continued)

OTHER PUBLICATIONS

Decision to Grant a Patent issued in Japanese Patent Application No. 2023-501763 dated Jan. 31, 2023.

*Primary Examiner* — Tuyen T Nguyen

(74) *Attorney, Agent, or Firm* — Birch, Stewart, Kolasch & Birch, LLP

(57) ABSTRACT

The wound core of the present invention has at least one arbitrary bent region 5A, in a plurality of corner portions (3), in which the corner portion (3) bulges outward to confine the magnetic flux flowing in the wound core so that the angle θ formed by the straight line PQ and the straight line PR satisfies 23°≤θ≤50°.

3 Claims, 12 Drawing Sheets

(51) Int. Cl.
*H01F 1/147* (2006.01)
*H01F 41/02* (2006.01)

(58) Field of Classification Search
USPC .......................................... 336/212, 233–234
See application file for complete search history.

(56) References Cited

U.S. PATENT DOCUMENTS

| | | | | |
|---|---|---|---|---|
| 11,869,697 | B2 * | 1/2024 | Mizumura | H01F 27/08 |
| 2016/0336100 | A1 | 11/2016 | Shiota et al. | |
| 2023/0395300 | A1 * | 12/2023 | Kawamura | H01F 41/0233 |

FOREIGN PATENT DOCUMENTS

| | | | |
|---|---|---|---|
| JP | 2015-141930 | A | 8/2015 |
| JP | 2018-148036 | A | 9/2018 |
| JP | 2019-117155 | A | 7/2019 |

* cited by examiner

WOUND CORE

TECHNICAL FIELD OF THE INVENTION

The present invention relates to a wound core.

The present application claims priority based on Japanese Patent Application No. 2021-163557 filed in Japan on Oct. 4, 2021, the contents of which are incorporated herein by reference.

RELATED ART

Cores of transformers include stacked cores and wound cores. Among them, wound cores are generally manufactured by stacking grain-oriented electrical steel sheets in layers, winding the stacked sheets in a doughnut shape (wound shape), and then pressing the wound body to form a substantially rectangular shape (in the present specification, a wound core manufactured in this way may be referred to as a trans-core). Through this forming process, the entire grain-oriented electrical steel sheets suffer mechanical working strain (plastic deformation strain), and the working strain serves as a cause of a great increase in iron loss in the grain-oriented electrical steel sheets. Therefore, strain relief annealing is to be performed.

Meanwhile, as another manufacturing method of a wound core, a technique as disclosed in Patent Documents 1 and 2 is disclosed in which steel sheets are bent at a portion to be a corner portion of a wound core in advance so as to form a relatively small bent region having a radius of curvature of 3 mm or less, and the bent steel sheets are layered to form a wound core (in the present specification, a wound core manufactured in this way may be referred to as a unicore (registered trademark)). According to this manufacturing method, a conventional large-scale forming process is unnecessary, the steel sheets are precisely folded to maintain the core shape, and the working strain is concentrated only on the bent portion (corner portion), so that strain removal by the annealing step can be omitted, and thus the manufacturing method is industrially advantageous (for example, capital investment is also easy) and has been used.

CITATION LIST

Patent Document

[Patent Document 1]
Japanese Unexamined Patent Application, First Publication No. 2018-148036
[Patent Document 2]
Japanese Unexamined Patent Application, First Publication No. 2015-141930

SUMMARY OF INVENTION

Problems to be Solved by the Invention

In the bending forming in which each steel sheet is folded at the portion to be the corner portion of the unicore, strain is introduced into the folded portion. Therefore, when the core is used without annealing, the strain remains in the folded portion and its peripheral portion, and thus there is a problem of an increase in core loss (loss of core).

The present invention has been made in view of the above circumstances, and an object of the present invention is to provide a wound core having a low iron loss even when used without annealing.

Means for Solving the Problem

In order to achieve the above object, the present invention provides a wound core including a hollow portion in a center and a portion in which grain-oriented electrical steel sheets each having flat portions and bent portions continuing alternately in a longitudinal direction are stacked in a sheet thickness direction, and the wound core is formed into a rectangular shape having four corner portions including the bent portions, by stacking the grain-oriented electrical steel sheets, each obtained by folding, in layers and assembling the grain-oriented electrical steel sheets into a wound state in which a plurality of the grain-oriented electrical steel sheets are connected to each other via at least one joint portion for each winding and a total of bending angles of the bent portions in each of the four corner portions is 90 degrees, wherein corresponding bent portions of the grain-oriented electrical steel sheets are stacked in layers in the sheet thickness direction to form one bent region, in a side view of the wound core, in at least one arbitrary bent region in the four corner portions, when P represents, in an innermost grain-oriented electrical steel sheet in the plurality of the grain-oriented electrical steel sheets stacked in layers, an intersection point of an extending line extending along an inner surface of a flat portion to a corner portion and an extending line extending along an inner surface of a flat portion between bent portions forming the corner portion, Q represents, in an outermost grain-oriented electrical steel sheet in the plurality of the grain-oriented electrical steel sheets stacked in layers, an intersection point of an extending line extending along an outer surface of a flat portion to the corner portion and an extending line extending along an outer surface of a flat portion between bent portions forming the corner portion, and R represents a point where a straight line, passing through the intersection point represented by P and extending in a direction perpendicular to an extending direction of each of the plurality of the grain-oriented electrical steel sheets to the corner portion, intersects the outer surface of the outermost grain-oriented electrical steel sheet, an angle θ formed by a straight line PQ and a straight line PR satisfies $23° \leq \theta \leq 50°$.

Here, in the present invention, the points P, Q, and R are specifically obtained by, as illustrated in FIG. 13, placing a wound core including a portion in which grain-oriented electrical steel sheets 1 each having flat portions 4 (4*a*) and bent portions 5 continuing alternately in the longitudinal direction are stacked in the sheet thickness direction on a paper surface 100, and, in a side view (the viewing direction illustrated in FIG. 13) of the wound core, drawing a line on the paper surface 100 along the surfaces of the grain-oriented electrical steel sheets 1 for at least one arbitrary bent region 5A in a plurality of corner portions 3 using a writing instrument such as a pencil or a marker pen. In this case, a writing instrument having a color different from that of the paper surface 100 is used so that the line can be recognized on the paper surface 100. Note that (a) of FIG. 13 illustrates a portion of the wound core, around one of the four corner portions 3 in a side view, and (b) of FIG. 13 clearly illustrates that corresponding bent portions 5 of the grain-oriented electrical steel sheets 1 are stacked in layers in the sheet thickness direction to form one bent region 5A.

In a more specific method of obtaining the points P, Q, and R, first, in an outermost grain-oriented electrical steel sheet 1*a* in a plurality of the grain-oriented electrical steel sheets 1 stacked in layers, an extending line L'1 extending along the outer surface of a flat portion 4 to a corner portion 3 is drawn on the paper surface 100 with a writing instrument. In the same grain-oriented electrical steel sheet 1*a*, an extending line L'2 extending along the outer surface of a flat portion 4*a* between bent portions 5 and 5 forming the corner portion 3 is drawn on the paper surface 100 with a writing instrument. An intersection point of the extending line L'1 and the extending line L'2 is represented by Q. Meanwhile, in an innermost grain-oriented electrical steel sheet 1*b* in the plurality of the grain-oriented electrical steel sheets 1 stacked in layers, an extending line L'3 extending along the inner surface of a flat portion 4 to the corner portion 3 is drawn on the paper surface 100 with a writing instrument. In the same grain-oriented electrical steel sheet 1*b*, an extending line L'4 extending along the inner surface of a flat portion 4*a* between bent portions 5 and 5 forming the corner portion 3 is drawn on the paper surface 100 with a writing instrument. An intersection point of the extending line L'3 and the extending line L'4 is represented by P. The term "inner surface" refers to a surface facing the inside of the wound core, and the term "outer surface" refers to a surface facing the outside of the wound core.

The point R is defined as a point where a straight line L'5 passing through the point P and extending in the direction perpendicular to the extending direction of each grain-oriented electrical steel sheet 1 to the corner portion 3 intersects the outer surface of the outermost grain-oriented electrical steel sheet 1*a*. The angle θ is an angle formed by the straight line PQ and the straight line PR, and is set to satisfy 23°≤8≤50° in the present invention.

The points (P), (Q), and (R) for the other bent region (5A) included in the same corner portion 3 are obtained in the same manner as described above.

In view of the actual situation that in a wound core having a form of a unicore in which a portion of a steel sheet to be a corner portion of the unicore is bent and formed by folding the steel sheet, strain is introduced into the bent portion to be a folded portion and this strain increases core iron loss, the present inventors have paid attention to the form of the corner portion including the bent portion as one factor of increasing core iron loss, and have obtained the following findings. If the angle θ is set to be small and the corner portion is drawn into the inside of the wound core, that is, for example, as illustrated in FIG. 12, if the angle θ is set to 22.5 degrees (a conventional general angle) (in FIG. 12, the intersection point in a bent portion of an outermost grain-oriented electrical steel sheet 1*a* defining 0=22.5 degrees is represented by Q') and a flat portion 4*a* between bent portions 5 and 5 forming a corner portion 3 extends with a width D1 (small thickness T1) as shown by a broken line, a magnetic flux 80 flowing in the wound core does not sufficiently bend in the corner portion 3 and thus flows to the outside and leaks into the air to increase iron loss, as illustrated in FIG. 11. Meanwhile, if the angle θ is set to be larger than 22.5 degrees so that the corner portion protrudes to the outside of the wound core, that is, for example, as illustrated in FIG. 12, the angle θ is set to be larger than 22.5 degrees so that the flat portion 4*a* between the bent portions 5 and 5 forming the corner portion 3 extends with a width D2 (large thickness T2) as shown by a solid line, the magnetic flux 80 flowing into the air is reduced to improve the iron loss.

As a result of intensive studies on the degree of protrusion of the corner portion to the outside, the present inventors have found that in at least arbitrary one of a plurality of bent regions of a corner portion formed by stacking corresponding bent portions of grain-oriented electrical steel sheets in layers in the sheet thickness direction, the magnetic flux flowing into the air in the corner portion can be effectively reduced to suppress iron loss to a low level if the degree of protrusion of the corner portion to the outside is optimized so that when P represents, in an innermost grain-oriented electrical steel sheet in the plurality of the grain-oriented electrical steel sheets stacked in layers, an intersection point of an extending line extending along an inner surface of a flat portion to the corner portion and an extending line extending along an inner surface of a flat portion between bent portions forming the corner portion, Q represents, in an outermost grain-oriented electrical steel sheet in the plurality of the grain-oriented electrical steel sheets stacked in layers, an intersection point of an extending line extending along an outer surface of a flat portion to the corner portion and an extending line extending along an outer surface of a flat portion between bent portions forming the corner portion, and R represents a point where a straight line, passing through the point P and extending in the direction perpendicular to the extending direction of each grain-oriented electrical steel sheet to the corner portion, intersects the outer surface of the outermost grain-oriented electrical steel sheet, the angle θ formed by the straight line PQ and the straight line PR satisfies 23°≤θ≤50°.

Here, if θ is less than 23°, the corner portion has a form of being drawn (sunk) toward the inside of the wound core in a state where the magnetic flux flowing in the wound core does not sufficiently bend in the corner portion and flows to the outside, so that the magnetic flux leaks into the air to increase iron loss. In contrast, if θ is increased to 23° or more, the corner portion bulges outward so as to confine the magnetic flux flowing in the wound core, so that the magnetic flux flowing into the air decreases to improve the iron loss. Meanwhile, if θ is more than 50°, in each grain-oriented electrical steel sheet, the interval between adjacent bent portions (the interval between bent portions adjacent to each other with a flat portion interposed therebetween) becomes small, and as a result, bent portions having a shape distorted by the bending strain and their peripheral portions are close to each other in the same grain-oriented electrical steel sheet, and in addition, bent portions having a distorted shape and their peripheral portions are closely in contact with each other among grain-oriented electrical steel sheets stacked in the sheet thickness direction, so that the elastic stress increases due to stacking of the strains to increase iron loss. Furthermore, the noise increases.

As described above, if in at least one arbitrary bent region in at least one arbitrary corner portion, the optimum form of the corner portion bulging outward is realized so that the angle θ formed by the straight line PQ and the straight line PR satisfies 23°≤8≤50°, a core having little residual strain (core with little iron loss deterioration) can be obtained even when the core is used without annealing.

In the present invention, the condition of 23°≤θ≤50° is to be satisfied in at least one arbitrary bent region in at least one arbitrary corner portion, and is preferably satisfied in as many bent regions as possible present in the wound core, and is more preferably satisfied in all of the bent regions present in the wound core. In this regard, for example, in a case where three or more bent regions are present in one corner portion, the condition of 23°≤θ≤50° is to be satisfied at least in a bent region where the grain-oriented electrical steel sheets extending to the corner portion first form a bent portion in the corner portion.

Two grain-oriented electrical steel sheets adjacent to each other in the thickness direction of the wound core are preferably different in length of a flat portion between bent portions forming an identical corner portion. For example, a more outside flat portion between bent portions forming the corner portion is preferably longer. That is, when the length of a grain-oriented electrical steel sheet layered m sheet(s) away from the innermost grain-oriented electrical steel sheet (m is an integer of 1 to M−1, and M represents the number for the outermost grain-oriented electrical steel sheet) and the length of a grain-oriented electrical steel sheet layered (m+1) sheets away from the innermost grain-oriented electrical steel sheet are compared, the grain-oriented electrical steel sheet (m+1) sheets away is preferably longer than the grain-oriented electrical steel sheet m sheet(s) away. If this condition is satisfied, the operation of stacking grain-oriented electrical steel sheets in layers is facilitated. That is, the grain-oriented electrical steel sheet (m+1) sheets away is easily fitted outside the grain-oriented electrical steel sheet m sheet(s) away.

When $\Delta L_m$ represents a difference between the length of the grain-oriented electrical steel sheet m sheet(s) away and the length of the grain-oriented electrical steel sheet (m+1) sheets away, and $\langle\Delta L\rangle$ represents an average of values of $\Delta L_m$ for all numbers represented by m, $\langle\Delta L\rangle$ preferably satisfies Formula (1) described below.

$$\langle\Delta L\rangle=10\times t\times\{(\pi\theta/180)^3+(\pi\theta/180)\} \quad (1)$$

In Formula (1), t represents the thickness of each grain-oriented electrical steel sheet. When Formula (1) is satisfied, it is assumed that θ is the same in all of the corner portions and t is the same in all of the grain-oriented electrical steel sheets. If this condition is satisfied, noise of the wound core is reduced.

The method of evaluating the thickness t of the grain-oriented electrical steel sheet is as follows. From a grain-oriented electrical steel sheet used at the time of producing a unicore, 10 single sheets having dimensions of 30 mm or more in the longitudinal direction and 30 mm or more in the width direction are cut out, these 10 sheets are stacked in layers, and the total thickness of the stacked body is measured using a micrometer (high-accuracy digimatic micrometer MDH-25 MB manufactured by Mitutoyo Corporation). The measurement is performed with the following method. That is, the thickness of the stacked body is measured at 10 sites in the stacked body, and 1/10 of the largest value is defined as the thickness t of the grain-oriented electrical steel sheet. The single sheets having dimensions of 30 mm or more in the longitudinal direction and 30 mm or more in the width direction may be collected from the unicore. In this case, each single sheet is collected from a flat portion excluding bent portions, and the bent portions are desirably cut off in advance with steel sheet cutting scissors or the like. Each single sheet having dimensions of 30 mm or more in the longitudinal direction and 30 mm or more in the width direction is cut out using a shearing machine, and in order to cut out the single sheet such that the dimensional accuracy of the single sheet is ensured, the grain-oriented electrical steel sheet needs to have a nominal sheet thickness within the specification range of the shearing machine. Examples of the shearing machine include a precision shearing machine ABH-512 manufactured by AIZAWA TEKKOSHO LTD.

Effects of the Invention

According to the present invention, a wound core can be realized that has a low iron loss even when used without annealing.

EMBODIMENTS OF THE INVENTION

Hereinafter, a wound core according to an embodiment of the present invention will be sequentially described in detail. However, the present invention is not limited only to the configuration disclosed in the present embodiment, and various modifications can be made without departing from the gist of the present invention. Note that a numerical range described below includes the lower limit and the upper limit. A numerical value indicated after the term "more than" or "less than" is not included in the numerical range. In addition, unless otherwise specified, the unit "%" regarding the chemical composition means "mass %".

Terms such as "parallel", "perpendicular", "identical", and "at right angle", values of length and angle, and the like, which specify shapes, geometric conditions, and degrees thereof, used in the present specification are not to be bound by a strict meaning but are to be interpreted including a range in which similar functions can be expected.

In the present specification, the "grain-oriented electrical steel sheet" may be simply described as "steel sheet" or "electrical steel sheet", and the "wound core" may be simply described as "core".

The wound core according to an embodiment of the present invention is a wound core including a wound core body having a substantially rectangular shape in a side view, and the wound core body includes a portion in which grain-oriented electrical steel sheets each having flat portions and bent portions continuing alternately in the longitudinal direction are stacked in the sheet thickness direction, and has a stacked structure having a substantially polygonal shape in a side view. The bent portions have a radius of curvature r of, for example, 1.0 mm or more and 5.0 mm or less on the inner surface side in the side view. The grain-oriented electrical steel sheet has a chemical composition, for example, in which the content of Si is 2.0 to 7.0 mass % and the remainder is Fe and an impurity, and has a texture oriented in the Goss orientation.

Next, the shapes of the wound core and the grain-oriented electrical steel sheet according to an embodiment of the present invention will be specifically described. The shapes of the wound core and the grain-oriented electrical steel sheet described here are not particularly new, and are merely based on the shapes of a known wound core and a known grain-oriented electrical steel sheet.

Figure 1:
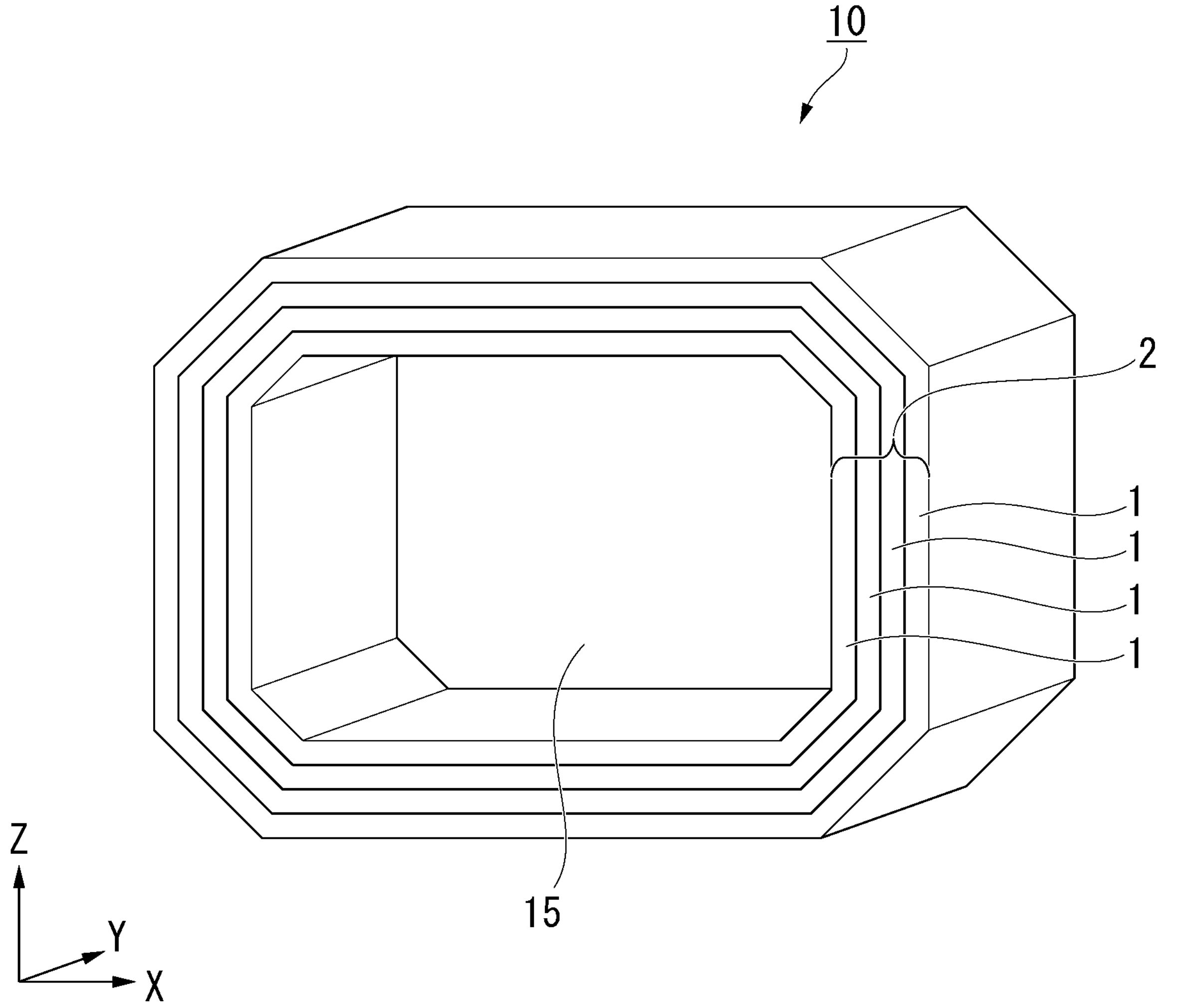
FIG. 1 is a perspective view schematically illustrating a wound core according to an embodiment of the present invention.
Figure 2:
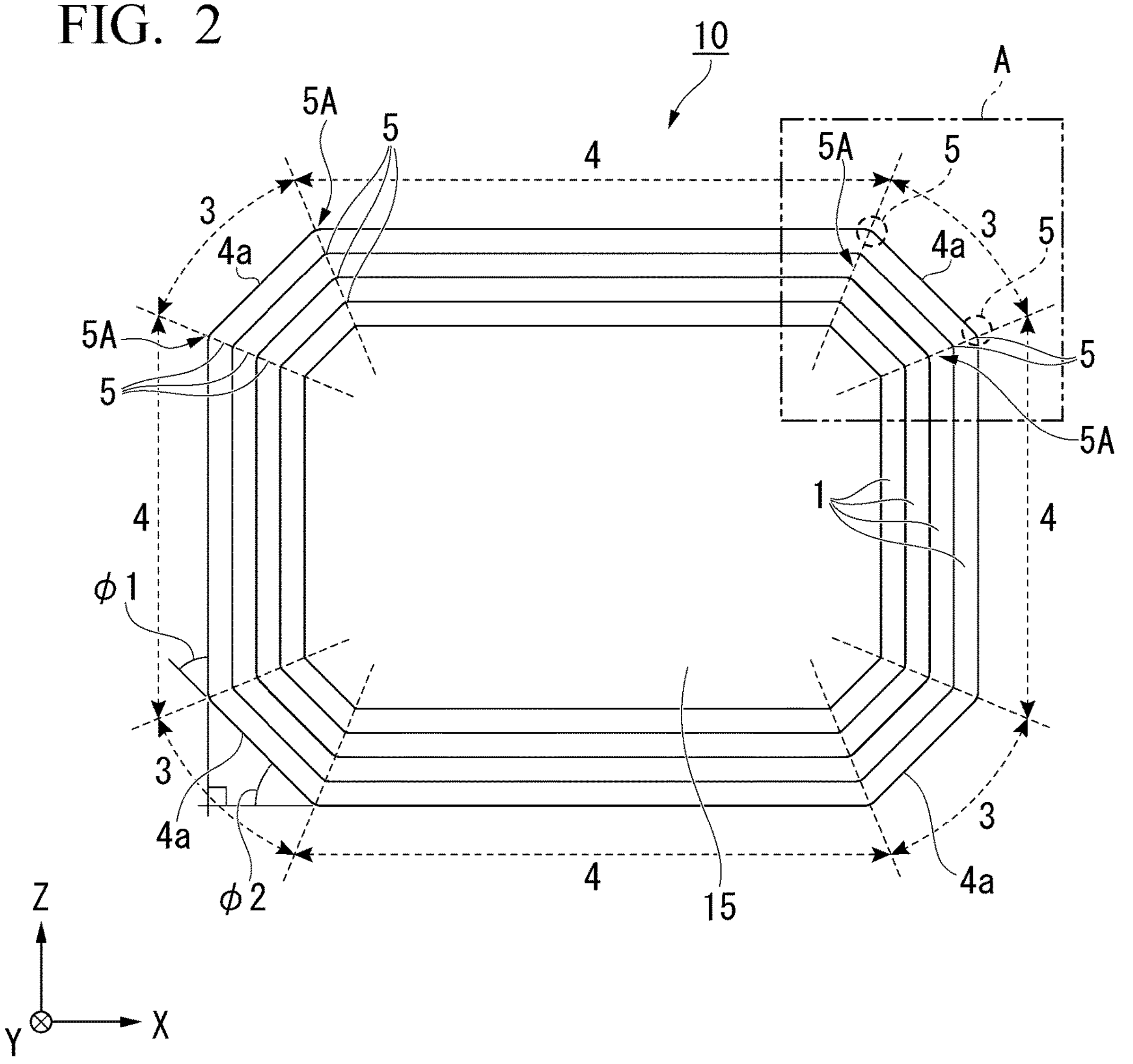
FIG. 2 is a side view of the wound core illustrated in the embodiment of FIG. 1.
Figure 3:
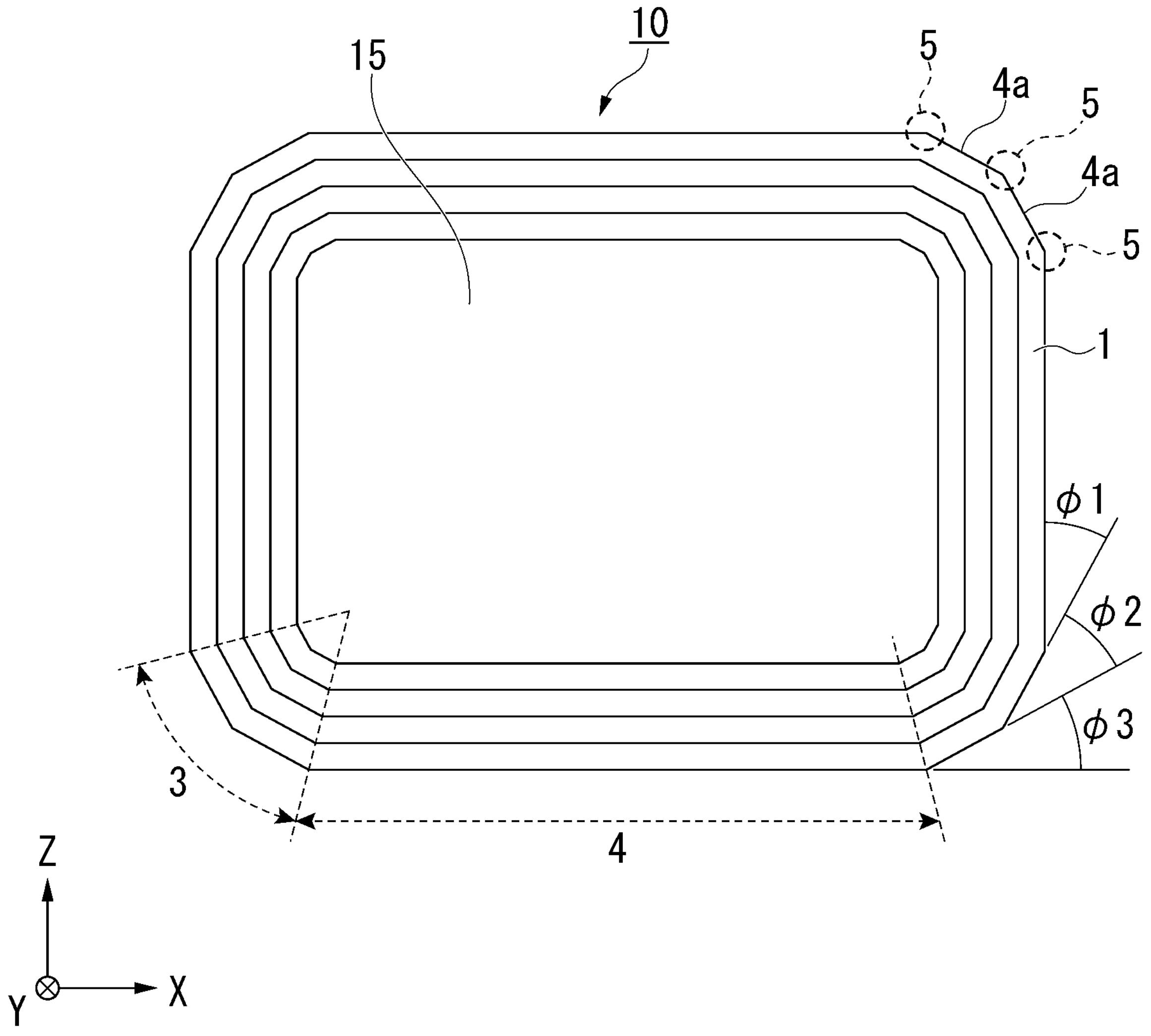
FIG. 3 is a side view schematically illustrating a wound core according to another embodiment of the present invention.

FIG. 1 is a perspective view schematically illustrating an embodiment of the wound core. FIG. 2 is a side view of the wound core illustrated in the embodiment of FIG. 1. FIG. 3 is a side view schematically illustrating another embodiment of the wound core.

In the present invention, the term "side view" refers to a view in the width direction (Y-axis direction in FIG. 1) of the elongated grain-oriented electrical steel sheet included in the wound core, and a drawing of a side view is a drawing illustrating a shape visually recognized in the side view (drawing in the Y-axis direction in FIG. 1).

The wound core according to an embodiment of the present invention includes a wound core body having a substantially polygonal shape in a side view. The wound core body has a stacked structure that includes grain-oriented electrical steel sheets stacked in the sheet thickness direction and has a substantially rectangular shape in a side view. The wound core body may be used as it is as a wound core, or may be provided with, for example, a known tightening tool such as a binding band in order to integrally fix a plurality of stacked grain-oriented electrical steel sheets as necessary.

In the present embodiment, the core length of the wound core body is not particularly limited. Even if the core length changes in the core, the iron loss generated in a bent portion is constant because the volume of the bent portion is constant, and thus the longer the core length is, the smaller the volume percentage of the bent portion is, and the smaller the influence on the iron loss deterioration is, and therefore the core length is preferably 1.5 m or more, and more preferably 1.7 m or more. In the present invention, the core length of the wound core body refers to the circumferential length at the center point in the stacking direction of the wound core body in a side view.

Such a wound core can be suitably used for any conventionally known application.

The core according to the present embodiment has a substantially polygonal shape in a side view. In the below description using a drawing, a core having a substantially rectangular shape (quadrangular shape), which is also a general shape, will be illustrated in order to simplify the illustration and the description, but cores having various shapes can be manufactured according to the angle and the number of bent portions and the length of flat portions. For example, if all the bent portions have an angle of 45° and the flat portions has an equal length, the shape in a side view is octagonal. If six bent portions having an angle of 60° are included and the flat portions has an equal length, the shape in a side view is hexagonal.

As illustrated in FIGS. 1 and 2, a wound core body 10 includes a portion in which grain-oriented electrical steel sheets 1 each having flat portions 4 and bent portions 5 continuing alternately in the longitudinal direction are stacked in the sheet thickness direction, and has a substantially rectangular stacked structure 2 having a hollow portion 15 in a side view. Corner portions 3 including the bent portions 5 each have two or more bent portions 5 having a curved shape in a side view, and the total of bending angles of the bent portions 5 present in one corner portion 3 is, for example, 90°. Each corner portion 3 has a flat portion **4*a* shorter than the flat portion 4, between adjacent bent portions 5 and 5. Therefore, the corner portion 3 has a form having two or more bent portions 5 and one or more flat portions 4*a*. In the embodiment of FIG. 2, one bent portion 5 has an angle of 45° (one corner portion 3 has two bent portions 5). In the embodiment of FIG. 3, one bent portion 5 has an angle of 30° (one corner portion 3 has three bent portions 5**).

As shown in these examples, the core of the present embodiment can be configured with bent portions having various angles, and from the viewpoint of suppressing occurrence of strain due to deformation during working to suppress iron loss, each bent portion 5 preferably has a bending angle φ (φ1, φ2, or φ3) of 60° or less, and more preferably 45° or less. The bending angles φ of bent portions included in one core can be freely set. For example, bending angles of φ1=60° and φ2=30° can be set. From the viewpoint of production efficiency, folding angles are preferably equal, and in a case where reduction in the number of sites deformed to a certain degree or more can reduce the iron loss of the core to be produced caused by the iron loss of the steel sheets to be used, different angles may be combined for working. The design can be freely selected according to a point considered to be important in core working.

Figure 6:
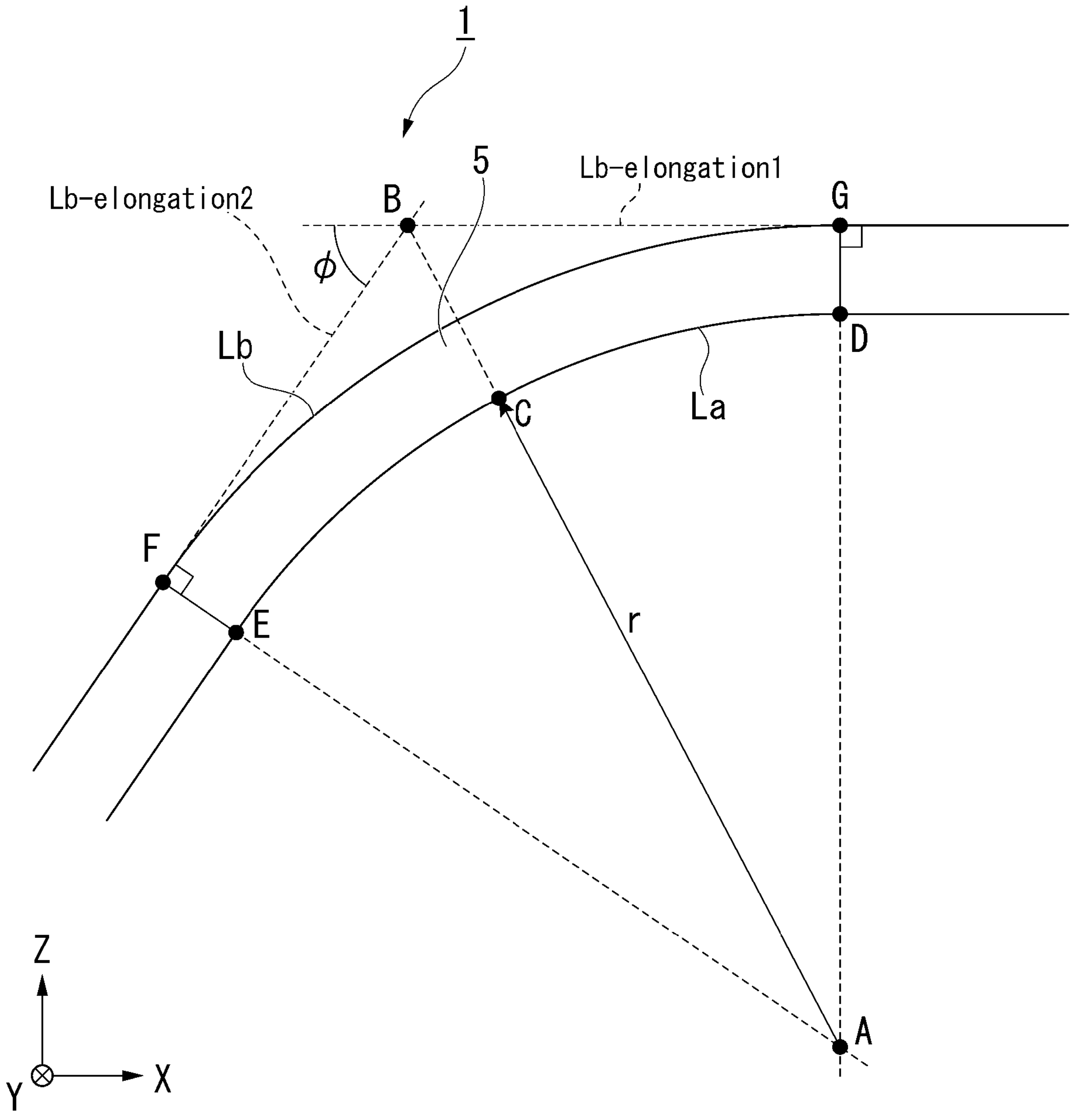
FIG. 6 is a side view schematically illustrating an example of a bent portion of a grain-oriented electrical steel sheet included in a wound core of the present invention.

The bent portion 5 will be described in more detail with reference to FIG. 6. FIG. 6 is a view schematically illustrating an example of a bent portion (curved portion) 5 of a grain-oriented electrical steel sheet 1. In the bent portion of the grain-oriented electrical steel sheet, the bending angle of the bent portion 5 means an angle difference generated between a straight line portion on the rear side and a straight line portion on the front side in the folding direction, and is expressed as an angle φ that is a supplementary angle of an angle formed by two imaginary lines Lb-elongation 1 and Lb-elongation 2 obtained by, on the outer surface of the grain-oriented electrical steel sheet 1, extending straight portions indicating surfaces of both flat portions 4 between which the bent portion 5 is interposed. At this time, a point at which the extended straight line separates from the sheet surface is the boundary between the flat portion and the bent portion on the surface on the steel sheet outer surface side, and in FIG. 6, a point F and a point G correspond to this point. An intersection point of the two imaginary lines Lb-elongation 1 and Lb-elongation 2 is a point B.

A straight line perpendicular to the steel sheet outer surface is extended from each of the point F and the point G, and the intersection points with the surface on the steel sheet inner surface side are defined as a point E and a point D, respectively. The points E and D are each a boundary between the flat portion 4 and the bent portion 5 on the surface on the steel sheet inner surface side.

In the present invention, the bent portion 5 is a portion of the grain-oriented electrical steel sheet 1 surrounded by the points D, E, F, and G in a side view of the grain-oriented electrical steel sheet 1. In FIG. 6, the sheet surface between the point D and the point E, that is, the inner surface of the bent portion 5 is represented by La, and the sheet surface between the point F and the point G, that is, the outer surface of the bent portion 5 is represented by Lb.

This view shows a radius of curvature on the inner surface side r of the bent portion 5 in a side view. The radius of curvature r of the bent portion 5 is obtained by approximating the La to an arc passing through the point E and the point D. The smaller the radius of curvature r is, the steeper the curve of the curved portion of the bent portion 5 is, and the larger the radius of curvature r is, the gentler the curve of the curved portion of the bent portion 5 is.

In the wound core of the present invention, the radius of curvature r of each bent portion 5 of the grain-oriented electrical steel sheets 1 stacked in layers in the sheet thickness direction may have a certain degree of variation. This variation may be due to forming accuracy, and unintended variation may occur due to, for example, handling at the time of stacking in layers. Such an unintended error can be suppressed to about 0.2 mm or less in current normal industrial manufacture. In a case where such a variation is large, the radius of curvature is measured for a sufficiently large number of steel sheets, and the radii are averaged to obtain a representative value. It is conceivable to vary the radius of curvature intentionally for some reason, and the present invention does not exclude such a form.

The method of measuring the radius of curvature r of the bent portion 5 is also not particularly limited, and for example, the radius of curvature r can be measured by observation at 200 times using a commercially available microscope (Nikon ECLIPSE LV150). Specifically, the curvature center A point is obtained from the observation result with a method, for example, in which a point A is defined as an intersection point obtained by extending the line segment EF and the line segment DG inward to the opposite side from the point B, a point C is defined an intersection point of a straight line connecting the point A and the point B with the steel sheet inner surface side (point on the arc La), and the magnitude of the radius of curvature r is determined as the length of the line segment AC.

Figure 4:
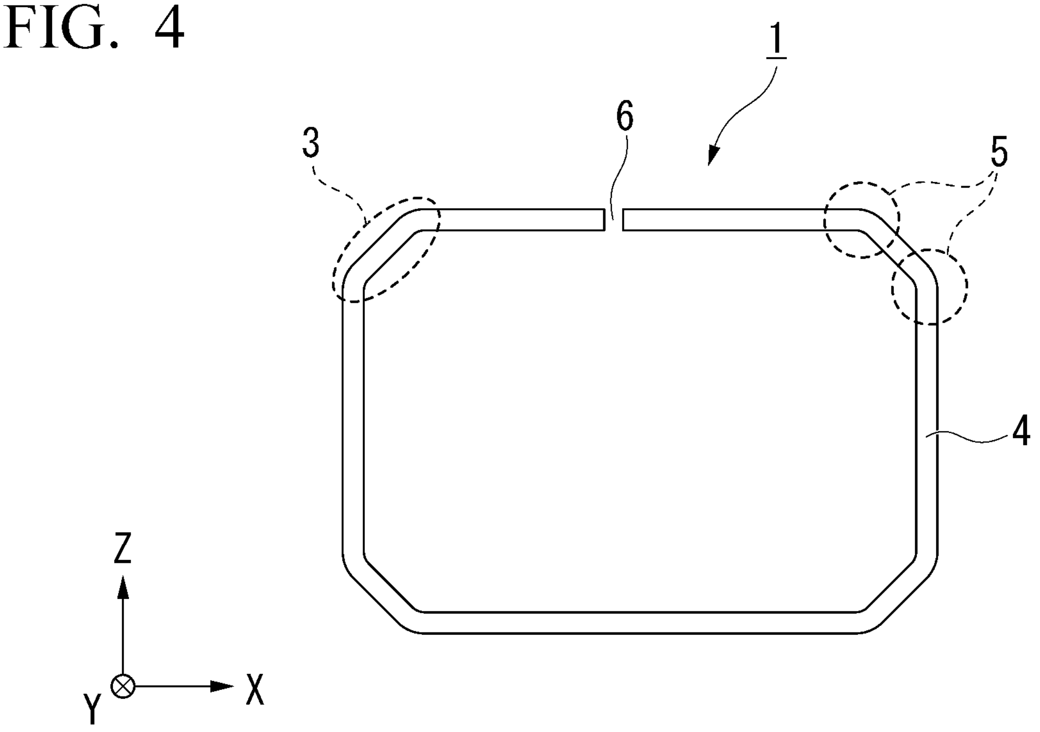
FIG. 4 is a side view schematically illustrating an example of one grain-oriented electrical steel sheet layer included in a wound core.
Figure 5:
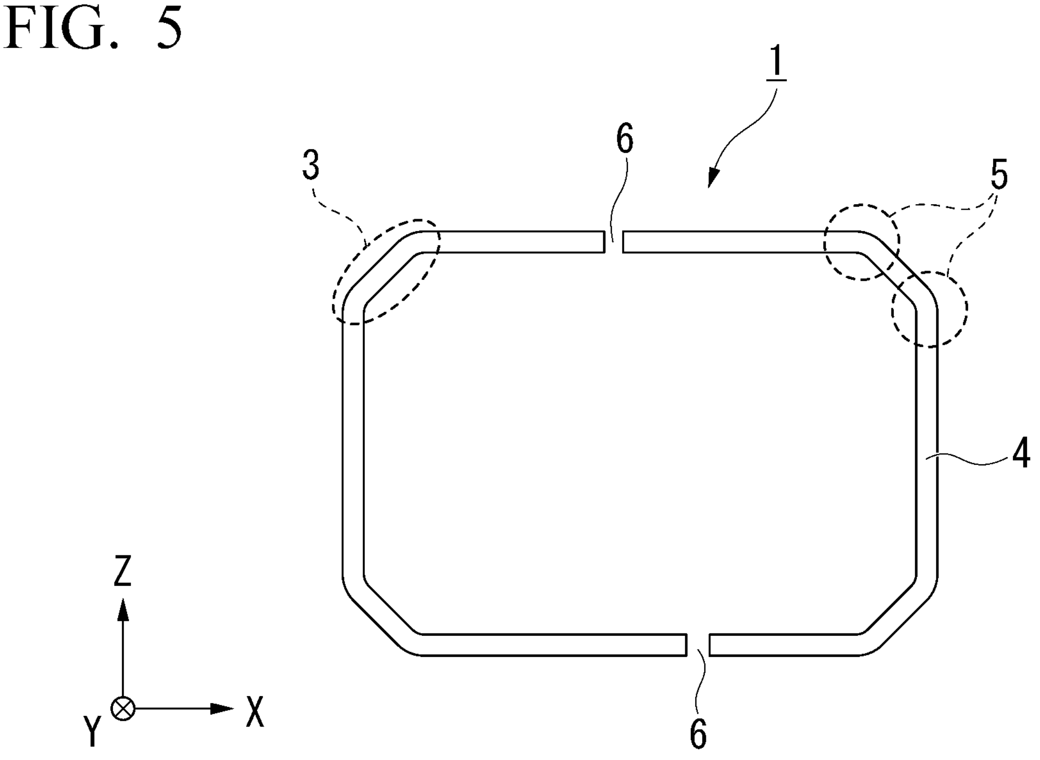
FIG. 5 is a side view schematically illustrating another example of one grain-oriented electrical steel sheet layer included in a wound core.

FIGS. 4 and 5 are a view schematically illustrating an example of one grain-oriented electrical steel sheet 1 layer in a wound core body. Each grain-oriented electrical steel sheet 1 used in the examples of FIGS. 4 and 5 is folded to realize a wound core having a unicore form, has two or more bent portions 5 and a flat portion 4, and forms a substantially polygonal ring, in a side view, via a joint portion 6 at an end surface in the longitudinal direction (X direction in the drawing) of one or more grain-oriented electrical steel sheets 1.

In the present embodiment, the wound core body is to have a stacked structure having a substantially polygonal shape as a whole in a side view. As illustrated in the example of FIG. 4, one grain-oriented electrical steel sheet may constitute one layer of the wound core body via one joint portion 6 (one grain-oriented electrical steel sheet is connected to itself via one joint portion 6 for each winding), or as illustrated in the example of FIG. 5, one grain-oriented electrical steel sheet 1 may constitute about a half circumference of the wound core, and two grain-oriented electrical steel sheets 1 may constitute one layer of the wound core body via two joint portions 6 (two grain-oriented electrical steel sheets are connected to each other via two joint portions 6 for each winding).

The sheet thickness of the grain-oriented electrical steel sheet 1 used in the present embodiment is not particularly limited, and is to be appropriately selected according to the application and the like, but is usually in the range of 0.15 mm to 0.35 mm, and preferably in the range of 0.18 mm to 0.27 mm.

A method of manufacturing the grain-oriented electrical steel sheet is not particularly limited, and a method of manufacturing a conventionally known grain-oriented electrical steel sheet can be appropriately selected. Preferred specific examples of the manufacturing method include a method in which a slab having a chemical composition in which the content of C is set to 0.04 to 0.1 mass % and the other components are as in the above-described grain-oriented electrical steel sheet is heated to 1000° ° C. or higher to perform hot rolling, and then hot-band annealing is performed as necessary, then cold rolling is performed once or twice or more with intermediate annealing interposed therebetween to form a cold-rolled steel sheet, and the cold-rolled steel sheet is heated to 700 to 900° C. in, for example, a wet hydrogen-inert gas atmosphere to perform decarburization annealing, nitriding annealing is further performed as necessary, an annealing separator is applied, then final annealing is performed at about 1000° ° C., and thus an insulating coating is formed at about 900° C. Thereafter, coating or the like may be further performed for adjusting the friction coefficient.

An effect of the present invention can also be obtained by using a steel sheet subjected to a treatment called "magnetic domain control", with a known method in the manufacturing process of the steel sheet, in which a strain or a groove is introduced by applying, in general, for example, a method such as laser irradiation, electron beam irradiation, shot peening, an ultrasonic vibration method, a machining method of scribing a sheet surface with a metal such as a knife, a ceramic piece, or the like, a method of ion implantation to a sheet surface, a doping method, an electrical discharge machining method, or a method combining plating and a heat treatment.

Figure 12:
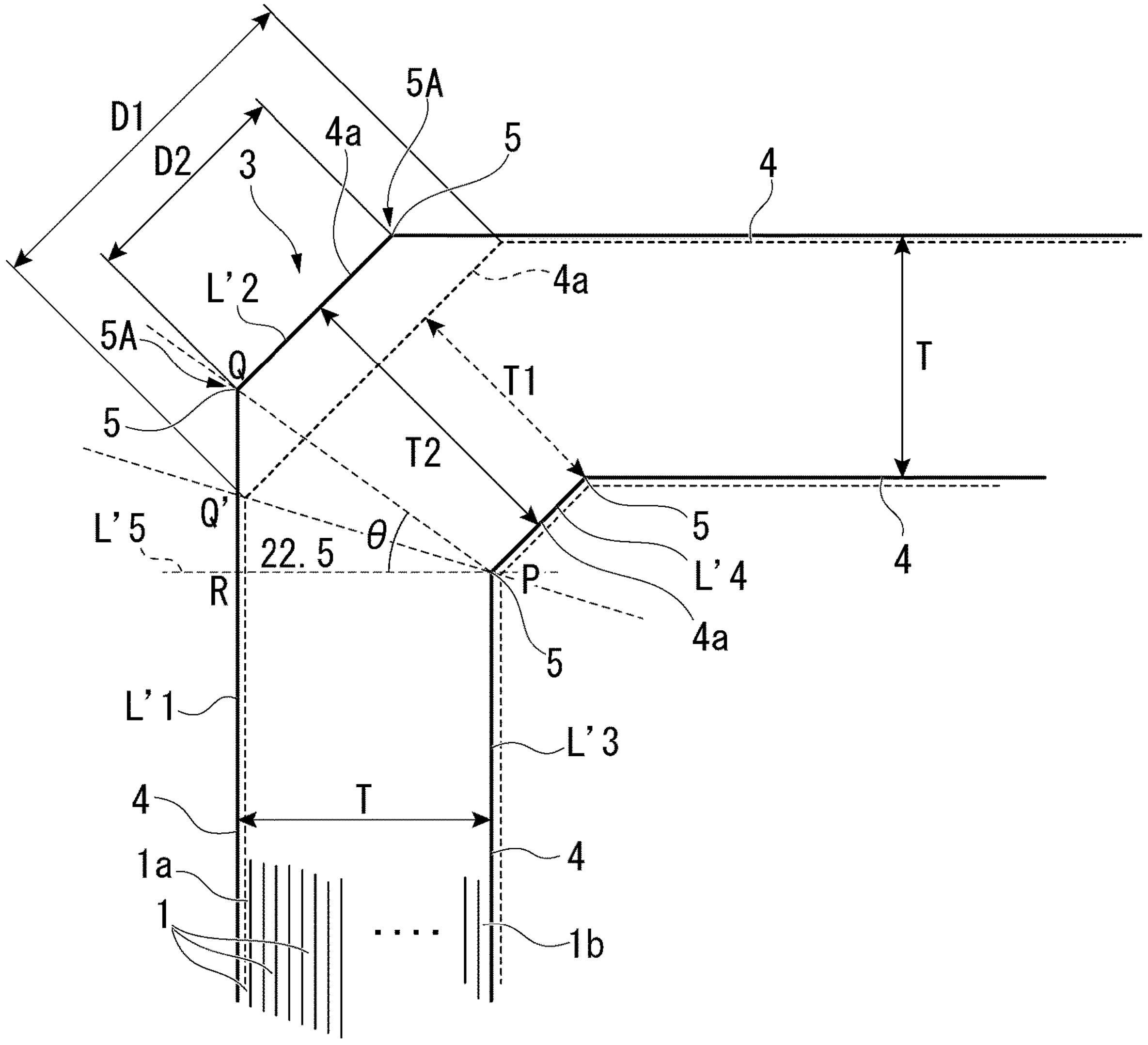
FIG. 12 is a schematic view illustrating a portion around one of four corner portions of a wound core in a side view, for illustration of a state where from the state of FIG. 11, the corner portion bulges outward so as to confine the magnetic flux flowing in the wound core.
Figure 13:
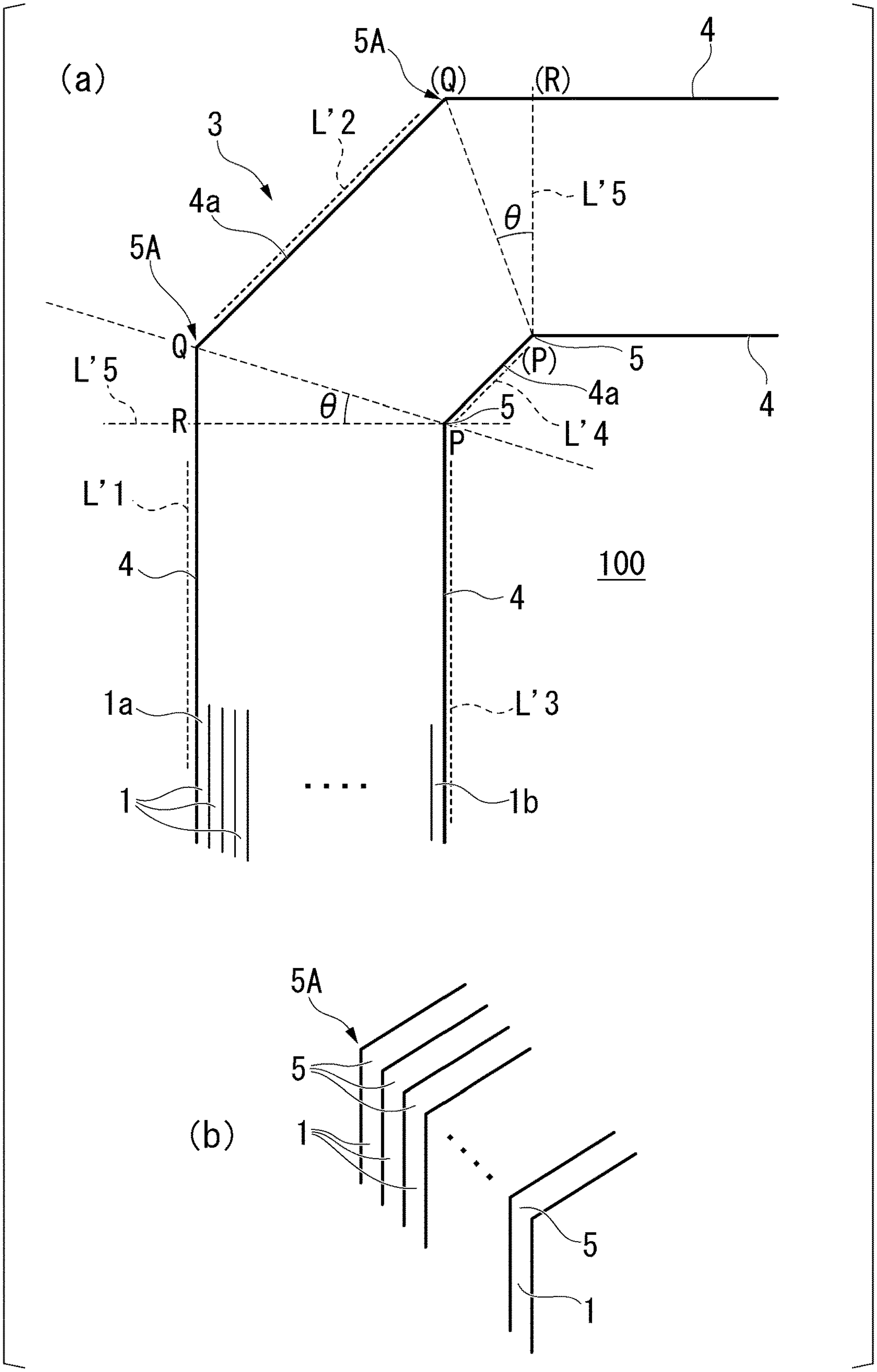
FIG. 13 is a schematic view illustrating a portion around one of four corner portions of a wound core in a side view, for illustration of how to define an angle θ.

In the present embodiment, the wound core (wound core body 10) including the grain-oriented electrical steel sheets 1 each having the above-described form is formed into a rectangular shape having four corner portions 3 including the bent portions 5 by stacking the grain-oriented electrical steel sheets 1 individually folded in layers and assembling them in a wound shape. A plurality of the grain-oriented electrical steel sheets 1 are connected to each other via at least one joint portion 6 for each winding, and the total of bending angles of the bent portions 5 in each corner portion 3 is 90 degrees. In this case, as illustrated in (b) of FIG. 13 described above, corresponding bent portions 5 of the grain-oriented electrical steel sheets 1 are stacked in layers in the sheet thickness direction to form one bent region 5A (see also FIG. 2). Such a wound core (wound core body 10) is characterized in that, in a side view, in at least arbitrary one of bent regions 5A, or particularly in the present embodiment, all of bent regions 5A of a plurality of corner portions 3, as illustrated in FIG. 12, when P represents, in an innermost grain-oriented electrical steel sheet 1*b* in a plurality of grain-oriented electrical steel sheets 1 stacked in layers, an intersection point of an extending line L'3 extending along an inner surface of a flat portion 4 to a corner portion 3 and an extending line L'4 extending along an inner surface of a flat portion 4*a* between bent portions 5 and 5 forming the corner portion 3, Q represents, in an outermost grain-oriented electrical steel sheet 1*a* in the plurality of grain-oriented electrical steel sheets 1 stacked in layers, an intersection point of an extending line L'1 extending along an outer surface of a flat portion 4 to the corner portion 3 and an extending line L'2 extending along an outer surface of a flat portion 4*a* between bent portions 5 and 5 forming the corner portion 3, and R represents a point where a straight line L'5, passing through the point P and extending in the direction perpendicular to the extending direction of each grain-oriented electrical steel sheet 1 to the corner portion 3, intersects the outer surface of the outermost grain-oriented electrical steel sheet 1*a*, the angle θ formed by the straight line PQ and the straight line PR satisfies $23° \leq \theta < 50°$. As a result, the thickness T2 of the wound core at the corner portion 3 is larger than the constant thickness (stacking thickness) T of the wound core at the flat portion 4, and the corner portion 3 bulges outward so as to confine a magnetic flux 80 flowing in the wound core. A more specific method of obtaining the points P, Q, and R is described above with reference to FIG. 13, and will not be described again here.

Figure 7:
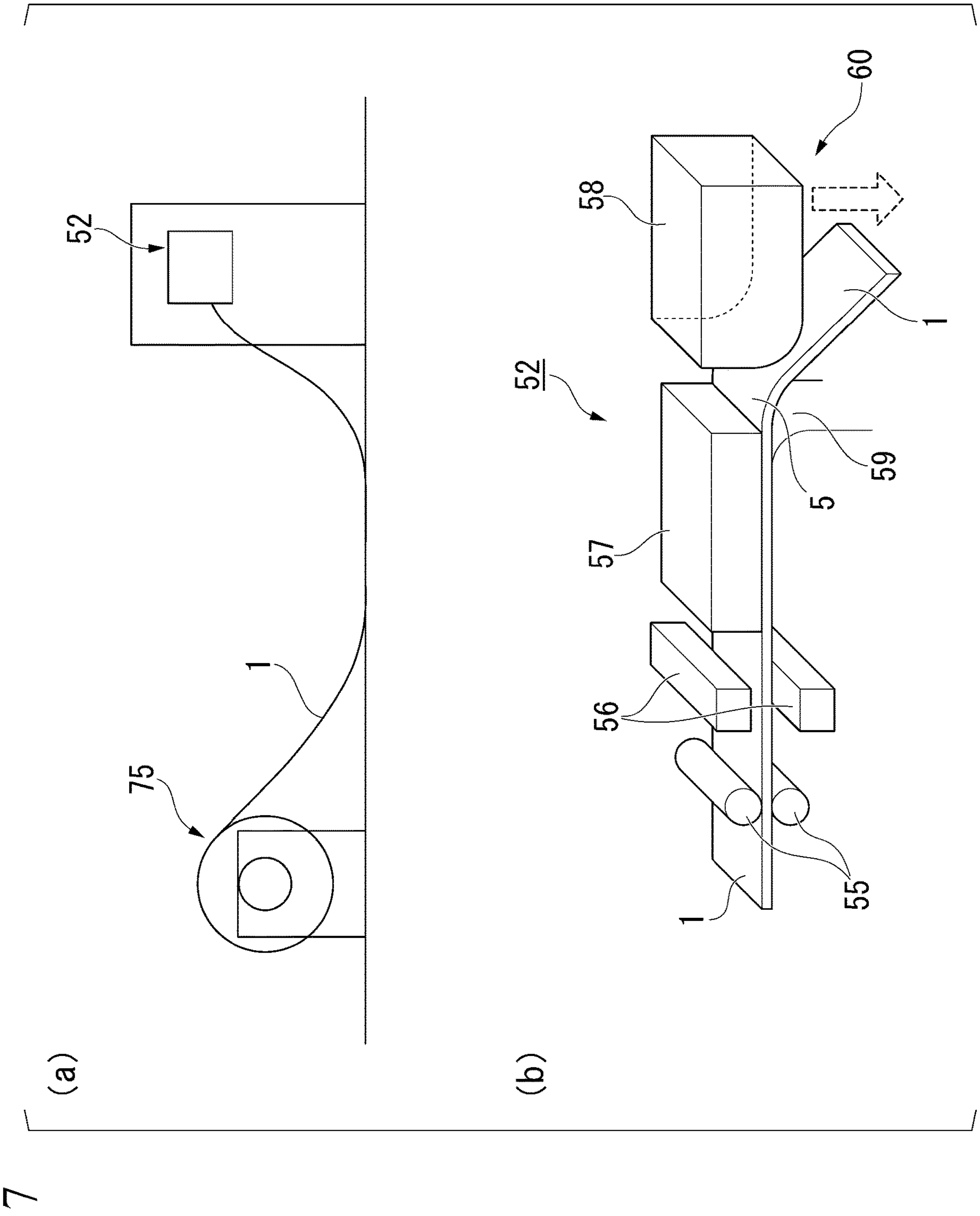
FIG. 7(*a*) is a schematic general view of a folding part of a manufacturing apparatus for manufacture of a wound core according to the present invention, and FIG. 7(*b*) is a schematic detailed perspective view of a working machine of the folding part in FIG. 7(*a*).

In order to fold and assemble the grain-oriented electrical steel sheets 1 into a wound shape so as to satisfy $23° \leq \theta \leq 50°$ as described above, the length (dimension in the longitudinal direction) of each grain-oriented electrical steel sheet 1 is preferably changed for each winding. Specifically, in a plurality of the grain-oriented electrical steel sheets 1 having a sheet thickness of t stacked in layers, the length of the grain-oriented electrical steel sheet 1 m sheet(s) outward away from the innermost grain-oriented electrical steel sheet 1*b* (m is an integer of 1 to M−1, and M represents the number for the outermost grain-oriented electrical steel sheet) is preferably controlled to be longer than the length of the innermost grain-oriented electrical steel sheet 1*b* by a predetermined size that is a function of m, θ, and the sheet thickness t. In this case, the grain-oriented electrical steel sheet 1 (m+1) sheets away is longer than the grain-oriented electrical steel sheet 1 m sheet(s) away. That is, a more outside flat portion 4*a* between bent portions 5 forming an identical corner portion 3 is longer. As a result, the operation of stacking the grain-oriented electrical steel sheets in layers is facilitated. That is, the grain-oriented electrical steel sheet (m+1) sheets away is easily fitted outside the grain-oriented electrical steel sheet m sheet(s) away. FIG. 7 shows an example of a folding machine 52 enabling such control.

As illustrated in (a) of FIG. 7, the folding machine 52 is supplied with a grain-oriented electrical steel sheet 1 delivered at a predetermined transport speed from a decoiler 75 as a steel sheet supply part that holds a hoop material formed by winding a grain-oriented electrical steel sheet 1 into a roll shape. The grain-oriented electrical steel sheet 1 supplied in this manner is subjected to folding in which the grain-oriented electrical steel sheet 1 is appropriately cut into sheets having an appropriate size in the folding machine 52, and a small number, such as one, of sheet(s) are folded at a time. As illustrated in (b) of FIG. 7, the folding machine 52 specifically includes a feed roll 55 that feeds a supplied grain-oriented electrical steel sheet 1 while holding the grain-oriented electrical steel sheet 1 from above and below, a guillotine 56 that cuts the grain-oriented electrical steel sheet 1 fed in such a manner into an appropriate size, and a bend forming portion 60 that folds the cut grain-oriented electrical steel sheet 1 to form a bent portion 5. The bend forming portion 60 includes a die 59 that supports a grain-oriented electrical steel sheet 1 from the lower side, a pad 57 that presses the grain-oriented electrical steel sheet 1 on the die 59 from the upper side, and a punch 58 that folds a free end of the grain-oriented electrical steel sheet 1 protruding from the die 59 by being pushed downward at a predetermined working speed by a predetermined amount as indicated by a broken line arrow to form a bent portion 5. In the present embodiment, such a folding machine 52 is used for changing the feed length of the grain-oriented electrical steel sheet 1 for each winding (for example, by changing the feed speed of the feed roll 55) to change the length (dimension in the longitudinal direction) of each grain-oriented electrical steel sheet 1 for each winding, and thus the above described condition $23° \leq \theta \leq 50°$ is satisfied, and a corner portion 3 bulging outward as shown in FIG. 12 is obtained.

Figure 9:
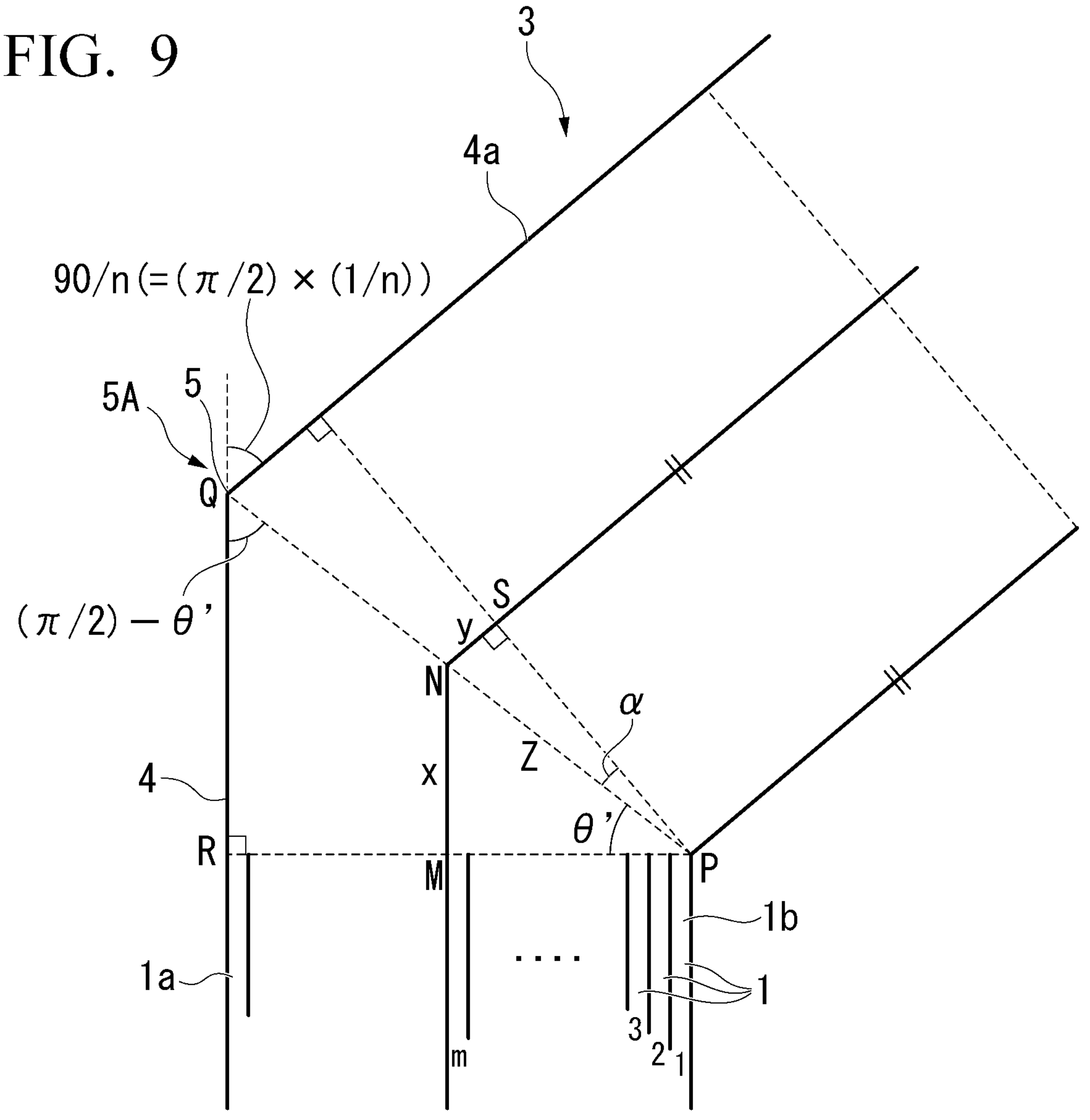
FIG. 9 is a view for explanation of steel sheet length control to set θ in the range of 23°≤θ≤50° in a case where one corner portion has two bent portions.

Such length control of the steel sheet 1 is performed, for example, as follows. That is, as illustrated in FIG. 9, in a case where one corner portion 3 has two bent regions 5A (each steel sheet 1 forms one corner portion 3 with two bent portions 5), when the thickness of one steel sheet 1 is represented by t (here, it is assumed that the thicknesses t of all the steel sheets 1 are the same), in one corner portion 3, the length of the grain-oriented electrical steel sheet 1 layered m sheet(s) outward away from the innermost grain-oriented electrical steel sheet 1*b* is geometrically longer than the length of the innermost grain-oriented electrical steel sheet 1*b* by 2×(x+y). Therefore, considering that there are four corner portions 3 (here, it is assumed that all the corner portions 3 have the same shape (have the same 0)), in the entire core, the length of the grain-oriented electrical steel sheet 1 layered m sheet(s) outward away from the innermost grain-oriented electrical steel sheet 1*b* is geometrically longer than the length of the innermost grain-oriented electrical steel sheet 1*b* by 8×(x+y).

Here, with respect to (x+y), in an imaginary triangle PMN having one side with a length of x and an imaginary triangle PNS having one side with a length of y, when n represents the number of bent regions 5A in one corner portion 3, α represents the angle of ∠SPN, and z represents the length of the line segment PN, $$\theta' = (\pi/180)\theta,$$

$$x = m \times t \times \tan\theta', \text{ and}$$

$$y = z \times \sin\alpha$$

are established.

Here, $$\cos\theta' = mt/z, \text{ and}$$

$$\alpha = (\pi/2n) - \theta'$$

are established, and therefore $$y = z \times \sin\alpha = mt \times \sin((\pi/2n) - \theta')/\cos\theta'$$

is established.

Therefore, in FIG. 9, since n=2, the length of the grain-oriented electrical steel sheet 1 layered m sheet(s) outward away from the innermost grain-oriented electrical steel sheet 1*b* is controlled to be longer than the length of the innermost grain-oriented electrical steel sheet 1*b* by $8 \times (x+y) = 8 \times mt(\tan\theta' + \sin((\pi/4) - \theta')/\cos\theta')$ to satisfy $23° \leq \theta \leq 50°$. However, when m=1 (when the grain-oriented electrical steel sheet 1 of interest is the grain-oriented electrical steel sheet 1*b*), the length of the grain-oriented electrical steel sheet 1 is freely determined.

Figure 10:
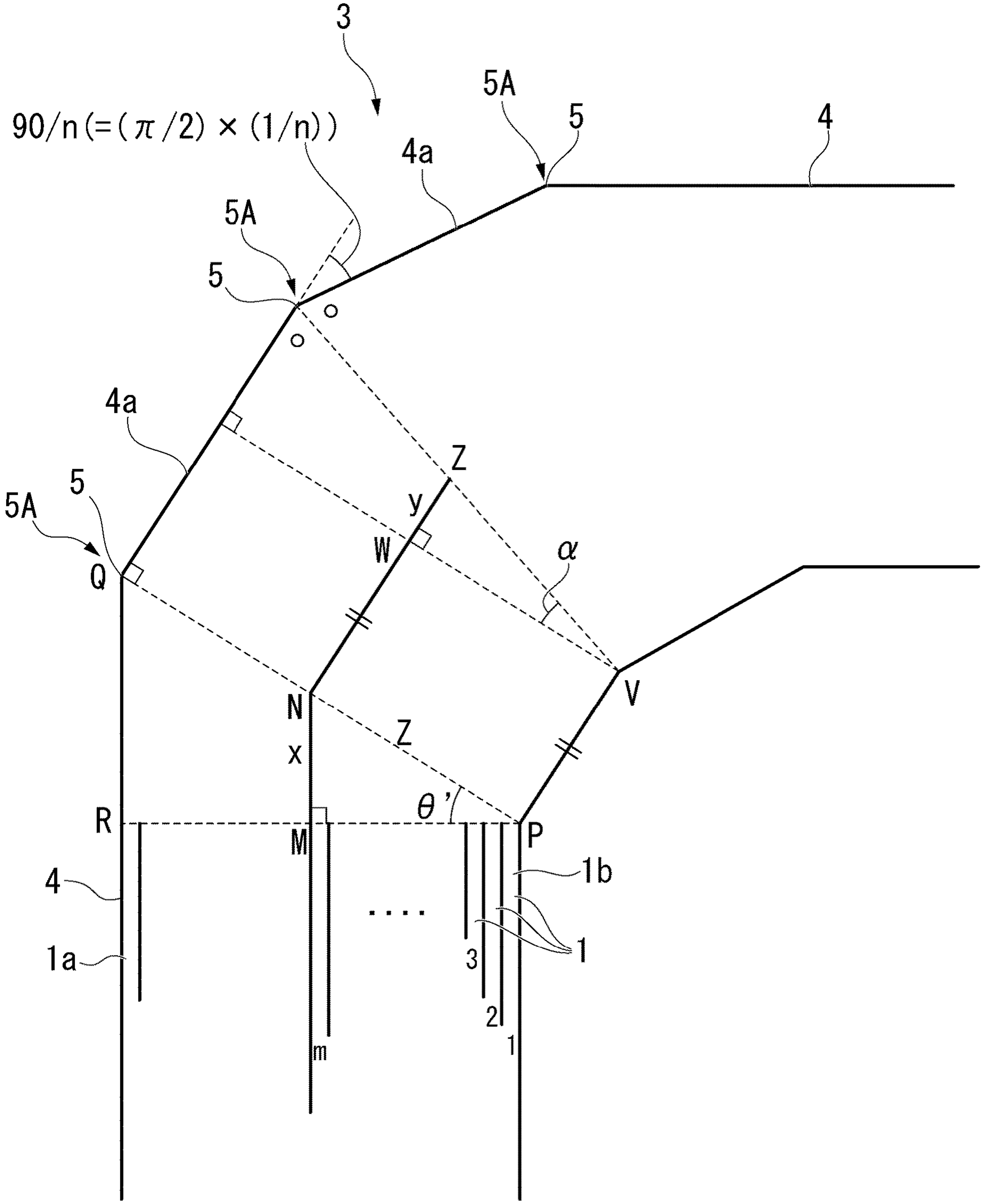
FIG. 10 is a view for explanation of steel sheet length control to set θ in the range of 23°≤θ≤50° in a case where one corner portion has three bent portions.
Figure 11:
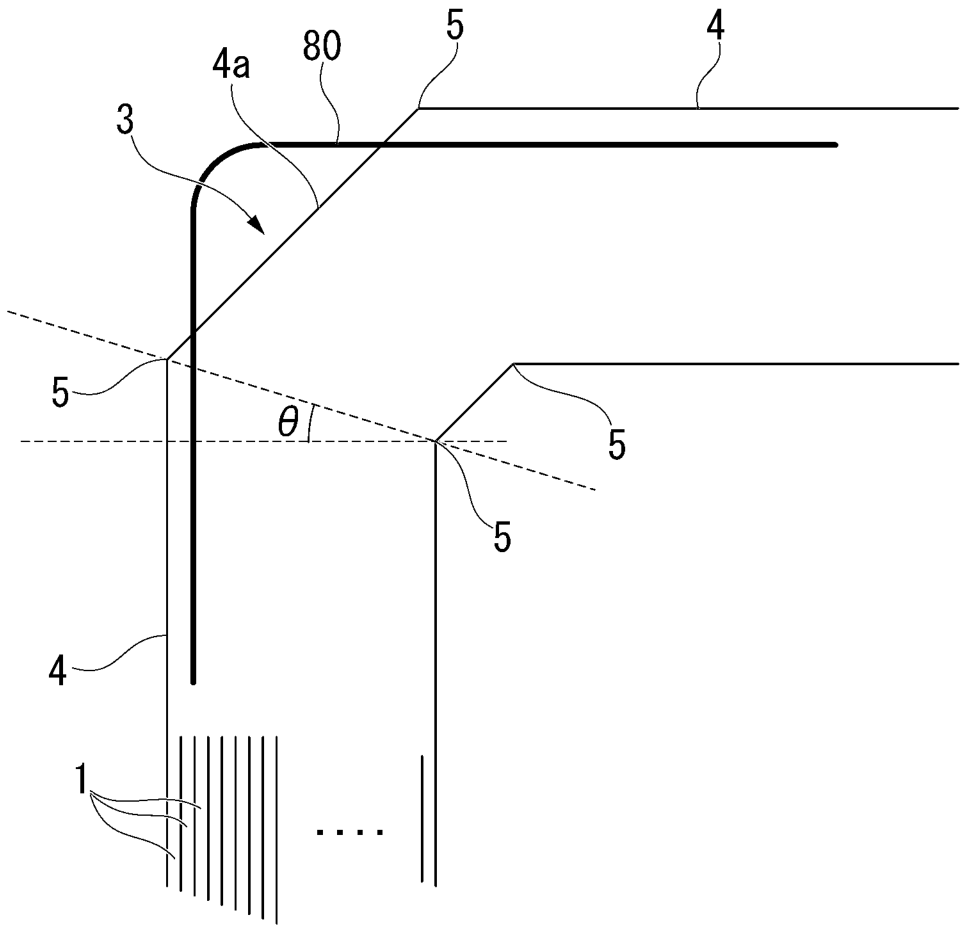
FIG. 11 is a schematic view illustrating a portion around one of four corner portions of a wound core in a side view, for illustration of a state where a magnetic flux flowing in the wound core does not sufficiently bend in the corner portion and flows to the outside and thus leaks into the air.

Also in a case where, as illustrated in FIG. 10, one corner portion 3 has three bent regions 5A (each steel sheet 1 forms one corner portion 3 with three bent portions 5), when the thickness of one steel sheet 1 is represented by t, in one corner portion 3, the length of the grain-oriented electrical steel sheet 1 layered m sheet(s) outward away from the innermost grain-oriented electrical steel sheet 1*b* is geometrically longer than the length of the innermost grain-oriented electrical steel sheet 1*b* by 2×(x+y). Therefore, considering that there are four corner portions 3, in the entire core, the length of the grain-oriented electrical steel sheet 1 layered m sheet(s) outward away from the innermost grain-oriented electrical steel sheet 1*b* is geometrically longer than the length of the innermost grain-oriented electrical steel sheet 1*b* by 8×(x+y).

Here, with respect to (x+y), in an imaginary triangle PMN having one side with a length of x and an imaginary triangle VWZ having one side with a length of y, when n represents the number of bent regions 5A in one corner portion 3, a represents the angle of ∠ZVW, and z represents the length of the line segment PN, $$\theta' = (\pi/180)\theta,$$

$$x = m \times t \times \tan\theta', \text{ and}$$

$$y = z \times \tan\alpha$$

are established.

Here, $$\cos\theta' = mt/z, \text{ and}$$

$$\alpha = \pi/4n$$

are established, and therefore $$y = z \times \tan\alpha = mt \times \tan((\pi/4n)/\cos\theta'$$

is established.

Therefore, in FIG. 10, since n=3, the length of the grain-oriented electrical steel sheet 1 layered m sheet(s) outward away from the innermost grain-oriented electrical steel sheet 1*b* is controlled to be longer than the length of the innermost grain-oriented electrical steel sheet 1*b* by 8×(x+y)=8×mt(tan θ'+ tan (π/12)/cos θ') to satisfy 23°≤ 0≤50°. However, when m=1 (when the grain-oriented electrical steel sheet 1 of interest is the grain-oriented electrical steel sheet 1*b*), the length of the grain-oriented electrical steel sheet 1 is freely determined.

Here, in the above-described example, the length of the grain-oriented electrical steel sheet 1 m sheet(s) away is geometrically determined, but the length of the grain-oriented electrical steel sheet 1 m sheet(s) away may be determined with another method. For example, when $\Delta L_m$ represents a difference between the length of the grain-oriented electrical steel sheet 1 m sheet(s) away and the length of the grain-oriented electrical steel sheet 1 (m+1) sheets away, and <ΔL> represents an average of values of $\Delta L_m$ for all numbers represented by m, the length of the grain-oriented electrical steel sheet 1 m sheet(s) away may be determined so that <ΔL> satisfies Formula (1) described below. However, when m=1 (when the grain-oriented electrical steel sheet 1 of interest is the grain-oriented electrical steel sheet 1*b*), the length of the grain-oriented electrical steel sheet 1 is freely determined.

$$\langle \Delta L \rangle = 10 \times t \times \{(\pi\theta/180)^3 + (\pi\theta/180)\} \quad (1)$$

If this condition is satisfied, noise of the wound core is reduced.

Figure 8:
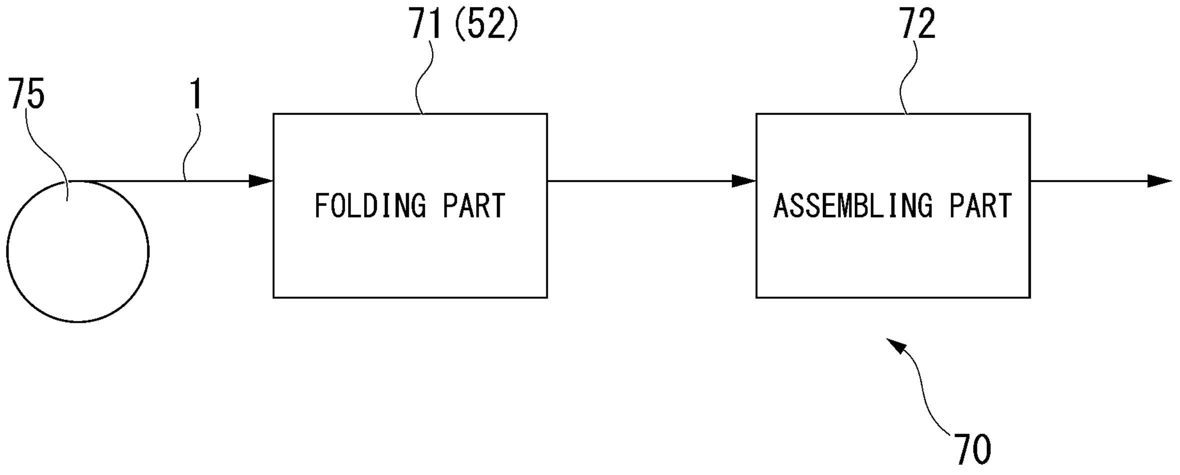
FIG. 8 is a block diagram schematically illustrating a configuration of a manufacturing apparatus of a wound core according to the present invention in the form of a unicore.

An apparatus that enables manufacture of a wound core with steel sheet length control and folding as described above is schematically illustrated in a block diagram in FIG. 8. FIG. 8 schematically illustrates a manufacturing apparatus 70 of a wound core in the form of a unicore, and the manufacturing apparatus 70 includes a folding part 71 that folds an individual grain-oriented electrical steel sheet 1, and may further include an assembling part 72 that stacks folded grain-oriented electrical steel sheets 1 in layers and assembles them into a wound shape to form a wound core having a wound shape including a portion in which grain-oriented electrical steel sheets 1 each having flat portions 4 and bent portions 5 continuing alternately in the longitudinal direction are stacked in the sheet thickness direction.

As described above, the folding part 71 is supplied with a grain-oriented electrical steel sheet 1 delivered at a predetermined transport speed from a decoiler 75 that holds a hoop material formed by winding a grain-oriented electrical steel sheet 1 into a roll shape. The grain-oriented electrical steel sheet 1 supplied in this manner is subjected to folding in which the grain-oriented electrical steel sheet 1 is appropriately cut into sheets having an appropriate size in the folding part 71, and a small number, such as one, of sheet(s) are folded at a time. In the grain-oriented electrical steel sheet 1 obtained as described above, the radius of curvature of the bent portion 5 generated by folding is extremely small, so that working strain applied to the grain-oriented electrical steel sheet 1 by the folding is extremely small. As described above, it is assumed that the density of working strain becomes large. Meanwhile, if the volume affected by the working strain can be reduced, the annealing step can be omitted.

The folding part 71 includes a folding machine 52 that performs steel sheet length control and folding as described above.

Examples

Hereinafter, the technical contents of the present invention will be further described with reference to Examples of the present invention. The conditions in Examples described below are examples of conditions adopted to confirm feasibility and an effect of the present invention, and the present invention is not limited to these Examples of conditions. The present invention can adopt various conditions as long as an object of the present invention is achieved without departing from the gist of the present invention.

In these Examples, grain-oriented electrical steel sheets (kinds of steel (steel sheet Nos.) A to E) shown in Table 1 were used for producing cores shown in Table 2, and core characteristics were measured. Tables 3A to 3C show detailed manufacture conditions and characteristics.

Specifically, Table 1 shows the sheet thickness (mm) and the magnetic characteristics of the grain-oriented electrical steel sheets of the kinds of steel A to E. The magnetic characteristics of the grain-oriented electrical steel sheets were measured in accordance with a method of testing magnetic characteristics of a single sheet by a single sheet tester (SST) specified in JIS C 2556: 2015. As the magnetic characteristics, the magnetic flux density B8 (T) in the rolling direction of each steel sheet excited at 800 A/m, and the iron loss (W/kg) at an AC frequency of 50 Hz and an excitation magnetic flux density of 1.7 T were measured.

TABLE 1

| Kind of steel | Product sheet thickness mm | Characteristics B8 T | Characteristics Iron loss W/kg |
|---|---|---|---|
| A | 0.30 | 1.900 | 0.87 |
| B | 0.23 | 1.900 | 0.75 |
| C | 0.20 | 1.900 | 0.65 |
| D | 0.18 | 1.900 | 0.55 |
| E | 0.15 | 1.900 | 0.45 |

Figure 14:
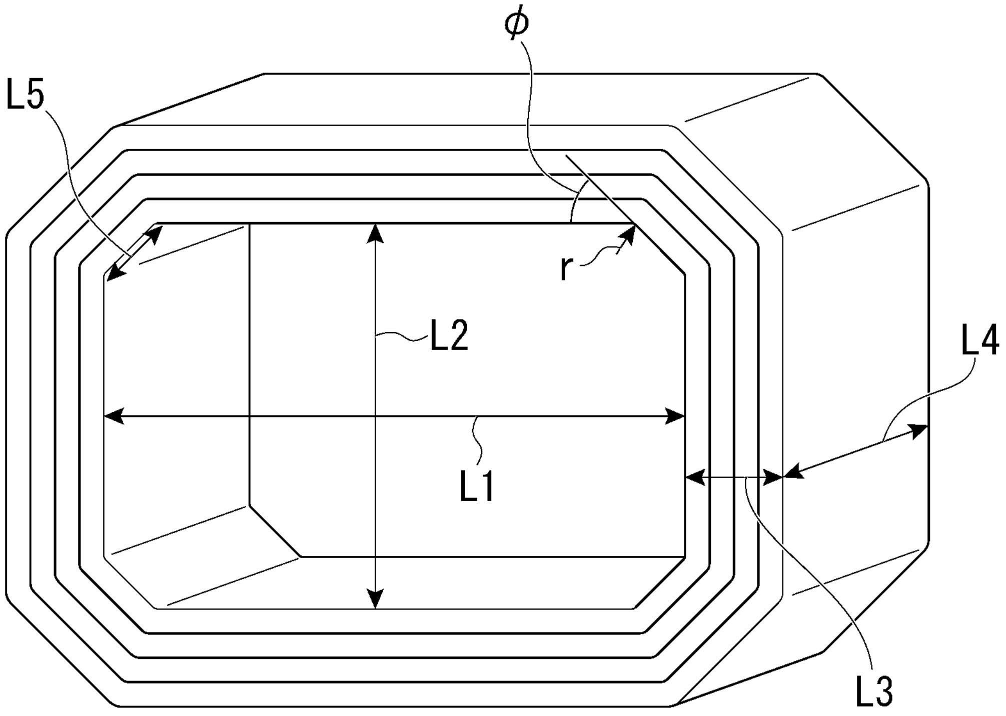
FIG. 14 is a schematic view illustrating dimensions of a wound core manufactured at the time of characteristic evaluation.

Furthermore, the present inventors manufactured cores a-1, a-2, b-1, and b-2 having shapes shown in Table 2 and FIG. 14 using materials of the kinds of steel A to E, respectively. Here, L1 represents the distance between one pair of inner surface side flat portions parallel to each other in the wound core, L2 represents the distance between the other pair of inner surface side flat portions parallel to each other in the wound core, L3 represents the thickness of the wound cores stacked in layers, LA represents the width of the steel sheets stacked in layers in the wound core, L5 represents the distance between flat portions arranged perpendicularly to each other in an innermost portion of the wound core, r represents the radius of curvature of a bent portion 5 on the inner surface side of the wound core (r is not shown in Table 2), and φ represents the bending angle of the above-described bent portion 5 of the wound core. In the core a-1 having a substantially rectangular shape, as illustrated in FIGS. 2 and 14, the number of bent portions 5 in one corner portion 3 is two, and as illustrated in FIG. 4, the number of joint portions 6 for each winding is one. In the core a-2 having a substantially rectangular shape, as illustrated in FIGS. 2 and 14, the number of bent portions 5 in one corner portion 3 is two, and as illustrated in FIG. 5, the number of joint portions 6 for each winding is two. In the core b-1 having a substantially rectangular shape, as illustrated in FIG. 3, the number of bent portions 5 in one corner portion 3 is three, and as illustrated in FIG. 4, the number of joint portions 6 for each winding is one. In the core b-2 having a substantially rectangular shape, as illustrated in FIG. 3, the number of bent portions 5 in one corner portion 3 is three, and as illustrated in FIG. 5, the number of joint portions 6 for each winding is two.

TABLE 2

| Core No. | Core shape L1 mm | L2 mm | L3 mm | LA mm | L5 mm | φ ° | Number of bent portions in one corner | Number of joint |
|---|---|---|---|---|---|---|---|---|
| a-1 | 197 | 66 | 47 | 152.4 | 4 | 45 | 2 | 1 |
| a-2 | 197 | 66 | 47 | 152.4 | 4 | 45 | 2 | 2 |
| b-1 | 197 | 66 | 47 | 152.4 | 4 | 30 | 3 | 1 |
| b-2 | 197 | 66 | 47 | 152.4 | 4 | 30 | 3 | 2 |

As shown in Tables 3A to 3C, the present inventors applied the above-described folding method to 95 test samples in the cores a-1, a-2, b-1, and b-2 manufactured using materials of the kinds of steel (steel sheet Nos.) A to E to change the degree of protrusion to the outside of a corner portion 3, that is, the angle θ variously, and furthermore, change the length of the grain-oriented electrical steel sheet constituting each layer (that is, m sheet(s) away) variously, and measured and evaluated the iron loss ratio (=core iron loss/material iron loss) based on the iron loss (W/kg) of the core and the iron loss (W/kg) of the material (steel sheet). In the evaluation, D indicates that the iron loss ratio is 1.25 or more, C indicates that the iron loss ratio is 1.17 or more and 1.24 or less, B indicates that the iron loss ratio is 1.15 or more and 1.16 or less, and A indicates that the iron loss ratio is 1.14 or less.

Furthermore, noise of the core was evaluated with the following method. That is, the core was excited, and the noise was measured. This noise measurement was performed in an anechoic chamber with a background noise of 16 dBA with a noise meter installed at a position of 0.3 m from the core surface using an A-weighted network. In the excitation, the frequency was set to 50 Hz, and the magnetic flux density was set to 1.7 T. The results are shown in Tables 3A to 3C.

In Tables 3A to 3C, in test Nos. 2-a, 5-a, 6-a, 7-a, 14-a, 15-a, 17-a, 20-a, 21-a, 25-a, 27-a, 30-a, 32-a, 35-a, 37-a, 39-a, 42-a, 45-a, 47-a, 48-a, 49-a, 50-a, 51-a, 52-a, 54-a, 57-a, 59-a, and 64-a, the length of the grain-oriented electrical steel sheet m sheet(s) away was determined geometrically (that is, as shown in FIG. 9). In the other test Nos., the length of the grain-oriented electrical steel sheet m sheet(s) away was determined so as to satisfy Formula (1). That is, <ΔL> was determined that was the average of all the values of a difference between the length of the grain-oriented electrical steel sheet m sheet(s) away and the length of the grain-oriented electrical steel sheet (m+1) sheets away, and the length of the grain-oriented electrical steel sheet m sheet(s) away, $L_m$, was adjusted so that <ΔL> satisfies Formula (1). The results are shown in Tables 3A to 3C.

In order to set the longitudinal length $L_m$ of each grain-oriented electrical steel sheet (grain-oriented electrical steel sheet m sheet(s) away) to a desired value, the feed length needs to be controlled and set to a target length in the above-described manufacturing apparatus 70. Meanwhile, the length $L_m$ of the grain-oriented electrical steel sheet can be evaluated by extracting the grain-oriented electrical steel sheet m sheet(s) away from a completed unicore and determining the longitudinal length $L_m$ (cm) of the grain-oriented electrical steel sheet as follows.

First, the weights of two grain-oriented electrical steel sheets, m sheet(s) away and (m+1) sheets away, extracted from the unicore are measured. In the measurement, an even balance (UP1023X manufactured by SHIMADZU CORPORATION) is used for measuring the weight K (g) of each sheet to the third decimal place. Next, the width w (cm) of the grain-oriented electrical steel sheet is measured with a ruler. The width is measured to the first decimal place. Finally, the thickness t of the grain-oriented electrical steel sheet is determined with the above-described method. Then, using the density of iron, which is 7.65 g/cm$^3$, the length of the grain-oriented electrical steel sheet m sheet(s) away, $L_m$, is determined from the following. The length of the grain-oriented electrical steel sheet (m+1) sheets away, $L_{m+1}$, is also determined with a similar method.

$$L_m=K/(7.65\times w\times t)$$

Next, a difference $\Delta L_m$ between the length of the grain-oriented electrical steel sheet m sheet(s) away, $L_m$, and the length of the grain-oriented electrical steel sheet (m+1) sheets away, $L_m$+1, are determined with the following formula.

$$\Delta L_m(\text{mm})=10*(L_{m+1}-L_m)$$

In this way, a difference $\Delta L_1$ between the length of the innermost grain-oriented electrical steel sheet (m=1) and the length of the grain-oriented electrical steel sheet one sheet away from the innermost sheet, a difference $\Delta L_2$ between the length of the grain-oriented electrical steel sheet one sheet away (m=2) and the length of the grain-oriented electrical steel sheet two sheets away, and similarly, $\Delta L_3$, $\Delta L_4$, . . . , and $\Delta L_{M-1}$ are determined up to the outermost side. M represents the number of sheets stacked in layers at the outermost side. Then, these differences are averaged to obtain the average of all the values, <ΔL>.

TABLE 3A

| Test No. | Steel sheet No. | Sheet thickness (mm) | Core No. | Angle θ (°) | <ΔL> (mm) | Material iron loss (W/kg) | Core iron loss (W/kg) | Iron loss ratio (= core iron loss/material iron loss) | Noise (dB) | Evaluation |
|---|---|---|---|---|---|---|---|---|---|---|
| 1 | A | 0.3 | a-1 | 22.5 | 1.3598 | 0.87 | 1.096 | 1.26 | 56 | D |
| 2 | A | 0.3 | a-1 | 23.0 | 1.3983 | 0.87 | 1.079 | 1.24 | 48 | C |
| 2-a | A | 0.3 | a-1 | 23.0 | 1.9954 | 0.87 | 1.079 | 1.24 | 56 | C |
| 3 | A | 0.3 | a-1 | 26.0 | 1.6417 | 0.87 | 1.035 | 1.19 | 48 | C |
| 4 | A | 0.3 | a-1 | 28.0 | 1.8162 | 0.87 | 1.018 | 1.17 | 45 | C |
| 5 | A | 0.3 | a-1 | 30.0 | 2.0014 | 0.87 | 0.992 | 1.14 | 42 | A |
| 5-a | A | 0.3 | a-1 | 30.0 | 2.1029 | 0.87 | 0.992 | 1.14 | 56 | A |
| 6 | A | 0.3 | a-1 | 31.5 | 2.1479 | 0.87 | 0.974 | 1.12 | 42 | A |
| 6-a | A | 0.3 | a-1 | 31.5 | 2.1278 | 0.87 | 0.974 | 1.12 | 56 | A |
| 7 | A | 0.3 | a-1 | 33.0 | 2.3011 | 0.87 | 0.992 | 1.14 | 42 | A |
| 7-a | A | 0.3 | a-1 | 33.0 | 2.1536 | 0.87 | 0.992 | 1.14 | 56 | A |
| 8 | A | 0.3 | a-1 | 35.5 | 2.5723 | 0.87 | 1.001 | 1.15 | 45 | B |
| 9 | A | 0.3 | a-1 | 37.0 | 2.7452 | 0.87 | 1.001 | 1.15 | 45 | B |
| 10 | A | 0.3 | a-1 | 39.0 | 2.9882 | 0.87 | 1.009 | 1.16 | 45 | B |
| 11 | A | 0.3 | a-1 | 40.5 | 3.1801 | 0.87 | 1.027 | 1.18 | 48 | C |
| 12 | A | 0.3 | a-1 | 43.0 | 3.5196 | 0.87 | 1.018 | 1.17 | 48 | C |
| 13 | A | 0.3 | a-1 | 44.0 | 3.6625 | 0.87 | 1.018 | 1.17 | 48 | C |
| 14 | A | 0.3 | a-1 | 44.5 | 3.7355 | 0.87 | 1.001 | 1.15 | 45 | B |
| 14-a | A | 0.3 | a-1 | 44.5 | 2.3878 | 0.87 | 1.001 | 1.15 | 56 | B |
| 15 | A | 0.3 | a-1 | 45.0 | 3.8096 | 0.87 | 0.992 | 1.14 | 42 | A |
| 15-a | A | 0.3 | a-1 | 45.0 | 2.4000 | 0.87 | 0.992 | 1.14 | 56 | A |
| 16 | B | 0.23 | a-1 | 22.5 | 1.0425 | 0.75 | 0.945 | 1.26 | 56 | D |
| 17 | B | 0.23 | a-1 | 30.0 | 1.5344 | 0.75 | 0.855 | 1.14 | 42 | A |
| 17-a | B | 0.23 | a-1 | 30.0 | 1.6122 | 0.75 | 0.855 | 1.14 | 56 | A |
| 18 | B | 0.23 | a-1 | 31.5 | 1.6467 | 0.75 | 0.840 | 1.12 | 42 | A |
| 19 | B | 0.23 | a-1 | 44.0 | 2.8079 | 0.75 | 0.878 | 1.17 | 48 | C |
| 20 | B | 0.23 | a-1 | 44.5 | 2.8639 | 0.75 | 0.863 | 1.15 | 45 | B |
| 20-a | B | 0.23 | a-1 | 44.5 | 1.8307 | 0.75 | 0.863 | 1.15 | 56 | B |
| 21 | B | 0.23 | a-1 | 45.0 | 2.9207 | 0.75 | 0.855 | 1.14 | 42 | A |
| 21-a | B | 0.23 | a-1 | 45.0 | 1.8400 | 0.75 | 0.855 | 1.14 | 56 | A |
| 23 | C | 0.2 | a-1 | 22.5 | 0.9065 | 0.65 | 0.819 | 1.26 | 56 | D |
| 24 | C | 0.2 | a-1 | 30.0 | 1.3343 | 0.65 | 0.728 | 1.12 | 42 | A |
| 25 | C | 0.2 | a-1 | 31.5 | 1.4319 | 0.65 | 0.722 | 1.11 | 42 | A |
| 25-a | C | 0.2 | a-1 | 31.5 | 1.4185 | 0.65 | 0.722 | 1.11 | 56 | A |
| 26 | C | 0.2 | a-1 | 44.0 | 2.4417 | 0.65 | 0.748 | 1.15 | 45 | B |
| 27 | C | 0.2 | a-1 | 45.0 | 2.5397 | 0.65 | 0.741 | 1.14 | 45 | A |

TABLE 3B

| Test No. | Steel sheet No. | Sheet thickness (mm) | Core No. | Angle θ (°) | <ΔL> (mm) | Material iron loss (W/kg) | Core iron loss (W/kg) | Iron loss ratio (= core iron loss/material iron loss) | Noise (dB) | Evaluation |
|---|---|---|---|---|---|---|---|---|---|---|
| 27-a | C | 0.2 | a-1 | 45.0 | 1.6000 | 0.65 | 0.741 | 1.14 | 56 | A |
| 28 | D | 0.18 | a-1 | 22.5 | 0.8159 | 0.55 | 0.693 | 1.26 | 56 | D |
| 29 | D | 0.18 | a-1 | 31.5 | 1.2887 | 0.55 | 0.616 | 1.12 | 42 | A |
| 29-a | D | 0.18 | a-1 | 31.5 | 1.2767 | 0.55 | 0.616 | 1.12 | 56 | A |
| 30 | D | 0.18 | a-1 | 45.0 | 2.2858 | 0.55 | 0.627 | 1.14 | 42 | A |
| 30-a | D | 0.18 | a-1 | 45.0 | 1.4400 | 0.55 | 0.627 | 1.14 | 56 | A |
| 31 | E | 0.15 | a-1 | 22.5 | 0.6799 | 0.45 | 0.563 | 1.25 | 56 | D |
| 32 | E | 0.15 | a-1 | 31.5 | 1.0739 | 0.45 | 0.500 | 1.11 | 42 | A |
| 32-a | E | 0.15 | a-1 | 31.5 | 1.0639 | 0.45 | 0.500 | 1.11 | 56 | A |
| 33 | E | 0.15 | a-1 | 45.0 | 1.9048 | 0.45 | 0.513 | 1.14 | 42 | A |
| 34 | B | 0.23 | a-2 | 22.5 | 1.0425 | 0.75 | 0.953 | 1.27 | 56 | D |
| 35 | B | 0.23 | a-2 | 31.5 | 1.6467 | 0.75 | 0.848 | 1.13 | 42 | A |
| 35-a | B | 0.23 | a-2 | 31.5 | 1.6313 | 0.75 | 0.848 | 1.13 | 56 | A |
| 36 | B | 0.23 | a-2 | 45.0 | 2.9207 | 0.75 | 0.870 | 1.16 | 45 | B |
| 37 | B | 0.23 | b-1 | 50.0 | 3.5356 | 0.75 | 0.893 | 1.19 | 48 | C |
| 37-a | B | 0.23 | b-1 | 50.0 | 2.9598 | 0.75 | 0.893 | 1.19 | 56 | C |
| 38 | B | 0.23 | b-1 | 28.5 | 1.4271 | 0.75 | 0.870 | 1.16 | 45 | B |
| 39 | C | 0.2 | b-1 | 30.5 | 1.3663 | 0.65 | 0.741 | 1.14 | 42 | A |
| 39-a | C | 0.2 | b-1 | 30.5 | 1.4400 | 0.65 | 0.741 | 1.14 | 56 | A |
| 40 | C | 0.2 | b-1 | 22.5 | 0.9065 | 0.65 | 0.826 | 1.27 | 56 | D |
| 41 | E | 0.15 | b-1 | 26.0 | 0.8208 | 0.45 | 0.527 | 1.17 | 48 | C |
| 42 | A | 0.3 | b-1 | 31.5 | 2.1479 | 0.87 | 0.983 | 1.13 | 42 | A |
| 42-a | A | 0.3 | b-1 | 31.5 | 2.2249 | 0.87 | 0.983 | 1.13 | 56 | A |

TABLE 3B-continued

| Test No. | Steel sheet No. | Sheet thickness (mm) | Core No. | Angle θ (°) | <ΔL> (mm) | Material iron loss (W/kg) | Core iron loss (W/kg) | Iron loss ratio (= core iron loss/material iron loss) | Noise (dB) | Evaluation |
|---|---|---|---|---|---|---|---|---|---|---|
| 43 | D | 0.18 | b-1 | 44.0 | 2.1975 | 0.55 | 0.633 | 1.15 | 45 | B |
| 44 | A | 0.3 | b-2 | 45.0 | 3.8096 | 0.87 | 1.009 | 1.16 | 45 | B |
| 45 | C | 0.2 | b-2 | 30.5 | 1.3663 | 0.65 | 0.735 | 1.13 | 42 | A |
| 45-a | C | 0.2 | b-2 | 30.5 | 1.4400 | 0.65 | 0.735 | 1.13 | 56 | A |
| 46 | D | 0.18 | b-2 | 23.0 | 0.8390 | 0.55 | 0.682 | 1.24 | 48 | C |
| 47 | B | 0.23 | b-1 | 50.0 | 3.5356 | 0.75 | 0.930 | 1.24 | 48 | C |
| 47-a | B | 0.23 | b-1 | 50.0 | 2.0572 | 0.75 | 0.930 | 1.24 | 56 | C |
| 48 | C | 0.2 | b-1 | 50.0 | 3.0745 | 0.65 | 0.735 | 1.13 | 42 | A |
| 48-a | C | 0.2 | b-1 | 50.0 | 1.7712 | 0.65 | 0.735 | 1.13 | 56 | A |
| 49 | D | 0.18 | b-1 | 50.0 | 2.7670 | 0.55 | 0.633 | 1.15 | 45 | B |
| 49-a | D | 0.18 | b-1 | 50.0 | 1.5805 | 0.55 | 0.633 | 1.15 | 56 | B |
| 50 | B | 0.23 | b-2 | 50.0 | 3.5356 | 0.75 | 0.930 | 1.24 | 48 | C |
| 50-a | B | 0.23 | b-2 | 50.0 | 2.0572 | 0.75 | 0.930 | 1.24 | 56 | C |

TABLE 3C

| Test No. | Steel sheet No. | Sheet thickness (mm) | Core No. | Angle θ (°) | <ΔL> (mm) | Material iron loss (W/kg) | Core iron loss (W/kg) | Iron loss ratio (= core iron loss/material iron loss) | Noise (dB) | Evaluation |
|---|---|---|---|---|---|---|---|---|---|---|
| 51 | B | 0.23 | b-1 | 60.0 | 5.0498 | 0.75 | 0.938 | 1.25 | 56 | D |
| 51-a | B | 0.23 | b-1 | 60.0 | 2.6693 | 0.75 | 0.938 | 1.25 | 56 | D |
| 52 | B | 0.23 | b-1 | 70.0 | 7.0042 | 0.75 | 0.938 | 1.25 | 56 | D |
| 52-a | B | 0.23 | b-1 | 70.0 | 3.8197 | 0.75 | 0.938 | 1.25 | 56 | D |
| 53 | B | 0.23 | b-1 | 80.0 | 9.4722 | 0.75 | 0.938 | 1.25 | 56 | D |
| 54 | B | 0.23 | b-1 | 89.5 | 12.3593 | 0.75 | 0.938 | 1.25 | 56 | D |
| 54-a | B | 0.23 | b-1 | 89.5 | 130.5238 | 0.75 | 0.938 | 1.25 | 56 | D |
| 55 | C | 0.2 | b-1 | 60.0 | 4.3912 | 0.65 | 0.813 | 1.25 | 56 | D |
| 56 | C | 0.2 | b-1 | 89.5 | 10.7472 | 0.65 | 0.813 | 1.25 | 56 | D |
| 57 | D | 0.18 | b-1 | 60.0 | 3.9520 | 0.55 | 0.688 | 1.25 | 56 | D |
| 57-a | D | 0.18 | b-1 | 60.0 | 1.9765 | 0.55 | 0.688 | 1.25 | 56 | D |
| 58 | D | 0.18 | b-1 | 70.0 | 5.4816 | 0.55 | 0.688 | 1.25 | 56 | D |
| 59 | D | 0.18 | b-1 | 80.0 | 7.4130 | 0.55 | 0.688 | 1.25 | 56 | D |
| 59-a | D | 0.18 | b-1 | 80.0 | 4.8636 | 0.55 | 0.688 | 1.25 | 56 | D |
| 60 | D | 0.18 | b-1 | 89.5 | 9.6725 | 0.55 | 0.688 | 1.25 | 56 | D |
| 61 | B | 0.23 | b-2 | 70.0 | 7.0042 | 0.75 | 0.938 | 1.25 | 56 | D |
| 62 | B | 0.23 | b-2 | 80.0 | 9.4722 | 0.75 | 0.938 | 1.25 | 56 | D |
| 63 | C | 0.2 | b-2 | 60.0 | 4.3912 | 0.65 | 0.813 | 1.25 | 56 | D |
| 64 | C | 0.2 | b-2 | 70.0 | 6.0906 | 0.65 | 0.813 | 1.25 | 56 | D |
| 64-a | C | 0.2 | b-2 | 70.0 | 3.1603 | 0.65 | 0.813 | 1.25 | 56 | D |
| 65 | C | 0.2 | b-2 | 89.5 | 10.7472 | 0.65 | 0.813 | 1.25 | 56 | D |
| 66 | D | 0.18 | b-2 | 80.0 | 7.4130 | 0.55 | 0.688 | 1.25 | 56 | D |
| 67 | D | 0.18 | b-2 | 89.5 | 9.6725 | 0.55 | 0.688 | 1.25 | 56 | D |

As can be seen from Tables 3A to 3C, regardless of the thickness of the steel sheet, the number of bent portions 5 in one corner portion 3, and the number of joint portions 6 for each winding, the iron loss ratio is suppressed to 1.24 or less (iron loss of the wound core is suppressed) by setting θ to 23° or more and 50° or less. In particular, if θ is more than 30°, the iron loss ratio is 1.14 or less, and the iron loss is sufficiently suppressed.

Furthermore, noise can be reduced by determining the average of all the values, <ΔL>, such that Formula (1) is satisfied.

From the above results, it has become clear that in the wound core, of the present invention including the present embodiment, having a unicore form and satisfying 23°≤θ≤50°, iron loss deterioration is reduced.

BRIEF DESCRIPTION OF THE REFERENCE SYMBOLS

1 Grain-oriented electrical steel sheet
4 Flat portion
5 Bent portion
5A Bent region
6 Joint portion
10 Wound core (wound core body)

What is claimed is:

1. A wound core comprising:

a hollow portion in a center; and a portion in which grain-oriented electrical steel sheets are stacked in a sheet thickness direction, the grain-oriented electrical steel sheets each having flat portions and bent portions continuing alternately in a longitudinal direction, the wound core formed into a rectangular shape having four corner portions including the bent portions, by stacking the grain-oriented electrical steel sheets, each obtained by folding, in layers and assembling the grain-oriented electrical steel sheets into a wound state in which a plurality of the grain-oriented electrical steel sheets are connected to each other via at least one joint portion for each winding and a total of bending angles of the bent portions in each of the four corner portions is 90 degrees, wherein corresponding bent portions of the grain-oriented electrical steel sheets are stacked in layers in the sheet thickness direction to form one bent region, in a side view of the wound core, in at least one arbitrary bent region in the four corner portions, when P represents, in an innermost grain-oriented electrical steel sheet in a plurality of the grain-oriented electrical steel sheets stacked in layers, an intersection point of an extending line extending along an inner surface of a flat portion to a corner portion and an extending line extending along an inner surface of a flat portion between bent portions forming the corner portion, Q represents, in an outermost grain-oriented electrical steel sheet in a plurality of the grain-oriented electrical steel sheets stacked in layers, an intersection point of an extending line extending along an outer surface of a flat portion to the corner portion and an extending line extending along an outer surface of a flat portion between bent portions forming the corner portion, and R represents a point where a straight line, the straight line passing through the intersection point represented by P and extending in a direction perpendicular to an extending direction of each of the plurality of the grain-oriented electrical steel sheets to the corner portion, intersects the outer surface of the outermost grain-oriented electrical steel sheet, an angle θ formed by a straight line PQ and a straight line PR satisfies $23° \leq \theta \leq 50°$.

2. The wound core according to claim 1, wherein two grain-oriented electrical steel sheets adjacent to each other in a thickness direction of the wound core are different in length of a flat portion between bent portions forming an identical corner portion.

3. The wound core according to claim 2, wherein when $\Delta L_m$ represents a difference between a length of a grain-oriented electrical steel sheet a number represented by m of sheets away from the innermost grain-oriented electrical steel sheet and a length of a grain-oriented electrical steel sheet a number represented by (m+1) of sheets away from the innermost grain-oriented electrical steel sheet, and $\langle\Delta L\rangle$ represents an average of values of $\Delta L_m$ for all numbers represented by m, $\langle\Delta L\rangle$ satisfies Formula (1) described below:

$$\langle\Delta L\rangle = 10 \times t \times \{(\pi\theta/180)^3 + (\pi\theta/180)\} \quad (1)$$

wherein t represents a thickness of each grain-oriented electrical steel sheet.

* * * * *